(12) United States Patent
Miller

(10) Patent No.: US 10,099,450 B1
(45) Date of Patent: Oct. 16, 2018

(54) MULTILAYER FLAME BARRIER AND FIRE SHELTER INCORPORATING SAME

(71) Applicant: Stephen D Miller, Flagstaff, AZ (US)

(72) Inventor: Stephen D Miller, Flagstaff, AZ (US)

( * ) Notice: Subject to any disclaimer, the term of this patent is extended or adjusted under 35 U.S.C. 154(b) by 0 days.

(21) Appl. No.: 15/376,579

(22) Filed: Dec. 12, 2016

Related U.S. Application Data

(60) Provisional application No. 62/415,897, filed on Nov. 1, 2016, provisional application No. 62/265,839, filed on Dec. 10, 2015.

(51) Int. Cl.
| | | |
|---|---|---|
| *B32B 3/00* | (2006.01) | |
| *B32B 15/14* | (2006.01) | |
| *B32B 29/02* | (2006.01) | |
| *B32B 15/12* | (2006.01) | |
| *B32B 3/06* | (2006.01) | |
| *B32B 7/08* | (2006.01) | |
| *B32B 7/12* | (2006.01) | |
| *A62B 17/00* | (2006.01) | |
| *A62C 2/06* | (2006.01) | |

(52) U.S. Cl.
CPC ............ *B32B 15/14* (2013.01); *A62B 17/003* (2013.01); *A62C 2/06* (2013.01); *B32B 3/06* (2013.01); *B32B 7/08* (2013.01); *B32B 7/12* (2013.01); *B32B 15/12* (2013.01); *B32B 29/02* (2013.01); *B32B 2262/101* (2013.01); *B32B 2307/3065* (2013.01); *B32B 2419/00* (2013.01); *B32B 2437/00* (2013.01); *B32B 2607/00* (2013.01)

(58) Field of Classification Search
CPC .. B32B 15/14; B32B 7/12; B32B 7/08; B32B 3/06; B32B 15/12; B32B 29/02; B32B 2607/00; B32B 2437/00; B32B 2262/101; B32B 2307/3065; B32B 2419/00; A62C 2/06; A62B 17/003
USPC ............... 112/426, 418, 142, 162, 177, 217; 428/61, 103, 104
See application file for complete search history.

(56) References Cited

U.S. PATENT DOCUMENTS

| | | | | | |
|---|---|---|---|---|---|
| 2,576,324 | A | * | 11/1951 | Wirt | ........................ D05B 5/062 112/418 |
| 3,873,409 | A | * | 3/1975 | Jehier | ..................... B32B 15/08 156/179 |
| 4,190,010 | A | * | 2/1980 | Bibby | .................... A41D 27/24 112/419 |
| 4,310,587 | A | * | 1/1982 | Beaupre | ................. B32B 15/08 427/500 |
| 4,505,977 | A | * | 3/1985 | Hasenauer | ............ F16L 59/029 106/DIG. 3 |
| 4,675,235 | A | * | 6/1987 | Wu | ........................ B32B 19/04 428/324 |

(Continued)

*Primary Examiner* — Brian E Glessner
*Assistant Examiner* — Joshua K Ihezie
(74) *Attorney, Agent, or Firm* — Invention To Patent Services; Alex Hobson

(57) ABSTRACT

A lightweight multilayer flame barrier includes alternating layers of a metal foil and an insulation layer to form a barrier layer. The metal foils may be configured on both the barrier surface and the interior surface. A barrier layer may be attached or coupled to a support layer. The lightweight multilayer flame barrier may be configured as a portable shelter that can be carried by fire service people and therefore may be lightweight and thin to enable compact storage and transport. The lightweight multilayer flame barrier may provide high convective exposure time in a thin lightweight composite.

27 Claims, 19 Drawing Sheets

(56) References Cited

U.S. PATENT DOCUMENTS

| | | | | |
|---|---|---|---|---|
| 4,920,575 A * | 5/1990 | Bartasis | ............... | A41D 27/245 2/275 |
| 5,079,077 A * | 1/1992 | Sakayanagi | ............. | H01B 3/04 428/324 |
| 5,212,387 A * | 5/1993 | Swan | ..................... | A61B 90/04 128/849 |
| 5,626,947 A * | 5/1997 | Hauer | ...................... | A62D 5/00 428/195.1 |
| 5,654,063 A * | 8/1997 | Kirk | ...................... | A62C 2/065 428/319.1 |
| 6,572,948 B1 * | 6/2003 | Dykhoff | ................. | A62C 2/065 169/56 |
| 7,434,272 B2 * | 10/2008 | Hannon | ............... | A41D 15/005 112/418 |
| 2006/0046598 A1 * | 3/2006 | Shah | ........................ | B32B 3/04 442/394 |
| 2006/0269721 A1 * | 11/2006 | Finkel | ...................... | B32B 5/02 428/99 |
| 2009/0140097 A1 * | 6/2009 | Collier | ..................... | B32B 5/18 244/121 |
| 2009/0194297 A1 * | 8/2009 | Ortiz Teruel | ............ | A62C 2/10 169/50 |
| 2009/0258180 A1 * | 10/2009 | Goulet | ............... | A41D 31/0016 428/72 |
| 2012/0282425 A1 * | 11/2012 | Gallagher | ............ | A41D 27/245 428/61 |
| 2013/0196136 A1 * | 8/2013 | Contzen | .................. | B32B 27/08 428/221 |
| 2017/0191257 A1 * | 7/2017 | Ciuperca | ............. | E04B 1/7633 |

\* cited by examiner

MULTILAYER FLAME BARRIER AND FIRE SHELTER INCORPORATING SAME

CROSS REFERENCE TO RELATED APPLICATIONS

This application claims the benefit of priority to U.S. provisional patent application No. 62/415,897 filed on Nov. 1, 2016 and entitled Lightweight Multilayer Flame Barrier, and U.S. provisional patent application No. 62/265,839 filed on Dec. 10, 2015 and entitled Lightweight Multilayer Flame Barrier, the entirety of each are hereby incorporated by reference herein.

BACKGROUND OF THE INVENTION

Field of the Invention

The present invention relates to lightweight multilayer flame barriers that can be used for personal protection, portable shelters and the like.

BACKGROUND

Fire proof and flame barrier materials require the incorporation of materials that can resist high temperatures and dissipate, absorb and/or reflect heat. In order to achieve both the desired flame barrier properties and the strength required, multilayer composites can become bulky or thick. There is a need for a lightweight flame barrier that has improved flame barrier performance without any increase in weight or thickness.

SUMMARY OF THE INVENTION

The invention is directed to a lightweight multilayer flame barrier comprising a plurality of metal foil layers and an insulation layer therebetween. In an exemplary embodiment, the lightweight multilayer flame barrier comprises at alternating layers of foil and an insulation layer to form a barrier layer. A barrier layer may have metal foil on both the fire exposure surface and an inside surface. An exemplary lightweight multilayer flame barrier comprises a support layer that provides additional strength and tear resistance and may comprise a fabric such as a fiberglass fabric. An lightweight multilayer flame barrier, as described herein, may be lightweight having a total weight of no more than about 30 oz/yd$^2$, or more preferably no more than about 20 oz/yd$^2$. A lightweight multilayer flame barrier may also be thin for the purposes of portable packaging and may have a thickness of no more than about 500 µm, and preferably no more than about 400 µm or even less than 300 µm. Likewise, a barrier layer may be extremely thin, such as no more than about 400 µm, or no more than about 300 µm, and even more preferably less than about 250 µm. The lightweight multilayer flame barrier may be configured into a protective article such as a portable shelter or garment such as a jacket. An exemplary lightweight multilayer flame barrier may be folded and packed into a small size and carried by an individual for donning or erecting in the case of emergency. An exemplary lightweight multilayer flame barrier may be configured to have a cold side time, as described in the test procedure herein, of more than about 20 seconds and more preferably more than about 30 or even 40 seconds while having a weight of less than about 200 oz/yd$^2$.

An exemplary lightweight multilayer flame barrier comprises alternating layers of a metal foil and an insulation layer. An exemplary lightweight multilayer flame barrier may have at least three layers of material including a metal foil on both the barrier side and inside surfaces and an insulating layer therebetween. In an exemplary embodiment, an lightweight multilayer flame barrier comprises five layers of alternating metal foil and insulating layers wherein both of the outer surfaces are a metal foil layer. In still another embodiment, an lightweight multilayer flame barrier comprises seven, nine or even eleven layers of alternating foil and insulating layers with a metal foil on the outer surfaces to form a barrier layer.

The metal foil and insulating layers of a barrier layer may be attached to each other by an adhesive. An adhesive may be a continuous layer or discrete point. An adhesive may be a fluid that is applied to one or more of the layers being attached. In still another embodiment, an adhesive is impregnated at least partially within a void volume or pore space within an insulating layer. An exemplary adhesive comprises silicone and may be a condensation cured silicone, acetoxy cured silicone, platinum catalyzed cured silicone or a peroxide cured silicone. An adhesive may be diluted with water or solvent prior to application to the lightweight multilayer flame barrier.

A metal foil may be any suitable type of metal including but not limited to, aluminum, copper, gold, platinum, nickel and iridium. In an exemplary embodiment, the metal foil is an aluminum foil having a thickness of no more than about 35 µm, no more than about 30 µm and even more preferably less 25 µm. A thin metal foil layer is preferred as it reduces weight and bulk of the lightweight multilayer flame barrier.

The insulation layer may comprise, consist essentially of, or consist entirely of a mica paper. A mica paper comprises flakes of mica that lay one atop another throughout the thickness of the mica paper. There may be some void volume or porosity within the mica paper and at least a portion may be filled with an adhesive or a solvent of the adhesive.

An exemplary mica paper is available from US Samica, Rutland Vt., US, Samica 4100. This exemplary mica paper has a density of about 1.65 g/cm3 and an aqueous extract conductivity of 5 micromhos/cm (max). Table 1 provides addition details of the mica papers available from US Samica.

TABLE 1

Mica Paper Properties
PHYSICAL PROPERTIES OF US SAMICA 4100:

| NOMINAL THICKNESS | | | NOMINAL THICKNESS | | | YIELD | | MIN. AVERAGE TENSILE STRENGTH | | MIN. AVERAGE* ELECTRICAL STRENGTH |
|---|---|---|---|---|---|---|---|---|---|---|
| MIL | High Limit | Low Limit | MM | High Limit | Low Limit | YD²/LB APPROX. | M²/KG APPROX. | LB/IN | KG/CM | Volts 60 HZ, RMS |
| 0.7 | +0.10 | −0.05 | 0.0177 | +0.00251 | −0.00127 | 18.1 | 33.5 | 2.0 | 0.356 | 650 |
| 0.9 | +0.05 | −0.15 | 0.0229 | +0.00127 | −0.00381 | 14.0 | 25.9 | 3.0 | 0.534 | 850 |
| 1.3 | +0.15 | −0.15 | 0.0330 | +0.00381 | −0.00381 | 10.4 | 19.2 | 4.0 | 0.712 | 1200 |
| 1.5 | +0.15 | −0.15 | 0.0381 | +0.00381 | −0.00381 | 9.0 | 16.7 | 5.0 | 0.890 | 1400 |
| 2.0 | +0.25 | −0.25 | 0.0508 | +0.00508 | −0.00508 | 6.6 | 12.3 | 5.0 | 0.890 | 1800 |

A lightweight multilayer flame barrier may comprise a support layer to increase the tensile and tear strength of the composite. A support layer may be any fabric, silica or alumina or zirconia for example. In an exemplary embodiment, the support layer is a woven or non-woven material and may comprise one or more layers as required to meet the physical requirements of an application.

An exemplary fiberglass insulation layer is available from JPS Composites, Anderson S.C., 1674 or 1675 E-Glass Fabric. Some of the properties of 1674 E-Glass Fabric are provided in Table 2:

TABLE 2

Fiberglass Properties

| STYLE 1674 | Material: E-Glass | US System | SI Units |
|---|---|---|---|
| Type a Yarns | Warp Yarn: | ECG 150 1/10 | EC9 33 |
|  | Fill Yarn: | ECG 150 1/10 | EC9 33 |
| Fabric Weight, Dry |  | 2.65 oz/yd² | 97 g/m² |
| Weave Style CONSTRUCTION | Plain |  |  |
| Nominal | Warp Count: | 40/in | 15.7/cm |
| Construction | Fill Count: | 32/in | 12.6/cm |
| Fabric Thickness |  | 4 mils | 0.10 mm |
| Yarn Breaking | Warp | 210 lbf/in | 184 daN/5 cm |
| Strength | Filling | 160 lbf/in | 140 daN/5 cm |
| Specifications | AMS 3824C | MIL-Y-1140 | IPC 4412 |

A high purity silica fabric Style 527 available from JPS Composite Materials, Anderson S.C., may also be used for a support layer. Data for this silica fabric is provided in Table 3.

TABLE 3

| Type of Yarns | Warp Yarn: | QCG 300 2/2 | QC9 16.2 x2 x2 |
|---|---|---|---|
|  | Fill Yarn: | QCG 300 2/2 | QC9 16.2 x2 x2 |
| Fabric Weight, Dry |  | 6.10 oz/yd² | 207 g/m² |
| Weave Style CONSTRUCTION | Plain |  |  |
| Nominal | Warp Count: | 42/in | 16.5/cm |
| Construction | Fill Count: | 32/in | 12.6/cm |
| Fabric Thickness |  | 8.0 mils | 0.20 mm |
| Yarn Breaking | Warp | 270 lbf/in | 236 daN/5 cm |
| Strength | Filling | 250 lbf/in | 219 daN/5 cm |
| Specifications | AMS 3846 |  |  |

Any suitable type of fireproof coating may be applied to one or more side surfaces, or within a layer of the lightweight multilayer flame barrier. An exemplary fireproof coating is available from Jios AeroVa®, Irvine Calif. JIOS AeroVa® Fireproof Coating is a high performance formulation which creates a dense silica barrier upon exposure to flame. The coating is an innovative formulation based on sodium silicate and aerogel. JIOS AeroVa® Fireproof Coating is compatible with a wide range of substrates including steel, iron, wood, concrete, and plastic. Some of the properties of the Jios Aerova Fireproof Coating are provided in Table 4.

TABLE 4

| Items | Specification |
|---|---|
| Viscosity(cPs) (Brookfield-DV III, Spindle No. 3 RPM 30) | 500~2000 |
| Color | Slightly Opaque |
| Resin Base | Sodium Silicate |
| Specific Gravity | 1.3~1.4 g/cm3 |
| Curing Condition(at 20° C.) | 24 h |
| Adhesion | KS F 4715:2007 |
| Application Method | Brush, Roller, Sprayer |

Comparative Example 1

This example consists of the lay-up used in the current M2002 Fire Shelter issued by the US Forrest Service. The lay-up includes two layers of fabric, which are not bonded together. They are held together at seams as needed in the shelter design however. The outer fabric in the lay-up, which faces the fire in event of deployment, includes a 10 oz/yd2 silica cloth bonded to a layer of aluminum foil with a fibrous insulator between the two, and the foil side faces the fire. The inner fabric, deployed facing the occupant, consists of a 1.4 oz/yd2 fiberglass cloth laminated to a layer of aluminum foil, and the foil faces the occupant. In use and in test, the outer and inner fabrics are touching but not bonded together. In an exemplary embodiment, a metal foil is on the barrier side of the lightweight multilayer flame barrier and is configured to face a fire or flame and reflect heat away and on the inside surface of the lightweight multilayer flame barrier, a foil having low emissivity, usually 0.1 or less, reduces radiant heat emitted to the interior, or to an occupant therein.

Comparative Example 2

This example consists of four components sandwiched together. The outer component is a layer of 5.6 oz/yd2 silica fabric bonded to aluminum foil from Custom Laminating, Mt. Bethel, Pa. The second and third components of the lay-up are 0.42 PCF fiberglass batting, 0.5 in. thick, from UPF Corporation, Bakersfield Calif., and the fourth component in the lay-up is PTFE-coated fiberglass cloth, Product Code #22-3, from LanMar Inc., Northbrook, Ill.

Example 1

An exemplary lightweight multilayer flame barrier contained five foil layers and four mica layers in an alternating array, which were bonded to a fiberglass cloth layer for support and strength. The foil and mica layers were arranged such that similar materials were not adjacent. An aluminum foil layer was placed on the outside of the laminate to reflect radiant heat. Approximately 1.2% of the weight of the laminate was water-soluble silicone rubber adhesive used to hold the layers together. For comparative testing purposes, the areal weight was designed to approximate the areal weight of the outer fabric of Comparative Example #1.

The components of Example 1 are identified in Table 5. The individual weights and thicknesses are labelled "theoretical", and the weight and thickness of the assembled laminate is labelled "measured".

TABLE 5

EXAMPLE 1

| Example #1<br>5 FOIL/MICA + CLOTH | AREAL<br>WEIGHT<br>OZ/YD$^2$ | THICKNESS<br>IN. |
|---|---|---|
| aluminum foil | 1.29 | 0.0007 |
| mica paper | 0.68 | 0.0009 |
| aluminum foil | 1.30 | 0.0007 |
| mica paper | 0.69 | 0.0009 |
| aluminum foil | 1.30 | 0.0007 |
| mica paper | 0.69 | 0.0009 |
| aluminum foil | 1.30 | 0.0007 |
| mica paper | 0.69 | 0.0009 |
| aluminum foil | 1.30 | 0.0007 |
| fiberglass cloth, Style 1674 | 2.76 | 0.004 |
| laminate adhesive | 0.15 | 0 |
| TOTAL (theoretical) | 12.15 | 0.011 |
| TOTAL (measured) | 12.14 | 0.017 |

Example 2

The lightweight multilayer flame barrier of Example 2 was similar to the construction of Example 1 except that is was intended to be thinner and lighter than Example 1 and matching the areal weight of the outer fabric in Comparative Example 2. The exemplary lightweight multilayer flame barrier of Example 2 contained two foil layers and two mica layers in an alternating arrangement. This array, with the foil facing outwards, was bonded to the fiberglass cloth layer for added support and strength. Approximately 3.3% of the weight of the laminate was water-soluble silicone rubber adhesive used to hold the layers together.

The components of Example 2 are identified in Table 6. The individual weights and thicknesses are labelled "theoretical", and the weight and thickness of the assembled laminate is labelled "measured".

TABLE 6

| 2 FOIL/MICA + CLOTH | AREAL<br>WEIGHT<br>OZ/YD$^2$ | THICKNESS<br>IN. |
|---|---|---|
| aluminum foil | 1.30 | 0.0007 |
| mica paper | 0.69 | 0.0009 |

TABLE 6-continued

| 2 FOIL/MICA + CLOTH | AREAL<br>WEIGHT<br>OZ/YD$^2$ | THICKNESS<br>IN. |
|---|---|---|
| aluminum foil | 1.30 | 0.0007 |
| mica paper | 0.69 | 0.0009 |
| fiberglass cloth, Style 1675 | 2.76 | 0.004 |
| laminate adhesive | 0.23 | 0 |
| TOTAL (theoretical) | 6.97 | 0.007 |
| TOTAL (measured) | 6.97 | 0.009 |

Example 3

The lightweight multilayer flame barrier of Example 3 comprised a barrier layer in its simplest form bonded to fabric for support. This example consisted of one layer of foil laminated to silica cloth, with a layer of mica paper between the two, and laminated with Loctite PolySeamSeal, IDH number 1510049, a water based silicone sealant. The binder (Loctite PolySeamSeal) content was approximately 13.6%. The barrier layer was combined with three layers of alumina fiber mat as insulation and a PTFE-coated fiberglass cloth gas barrier. In a Convective Exposure Test, as described herein, the lightweight multilayer flame barrier of Example 3 provided 22 seconds of protection before a $2^{nd}$ degree burn condition was measured. The components are identified in Table 7.

TABLE 7

| 1 FOIL/MICA + CLOTH | AREAL<br>WEIGHT<br>OZ/YD$^2$ | THICKNESS<br>IN. |
|---|---|---|
| aluminum foil | 1.30 | 0.0007 |
| mica paper | 0.69 | 0.0009 |
| silica fiber cloth | 3.53 | 0.008 |
| laminate adhesive | 0.87 | 0 |
| TOTAL (theoretical) | 6.39 | 0.010 |
| TOTAL (measured) | 6.39 | 0.010 |

Example 3A

For comparison to Example 3, a foil was bonded to a fabric using an equal weight of alumina fiber mat (Saffil Mat). This example consisted of one layer of foil laminated to silica cloth, with a layer of alumina fiber mat, made by separating a thin layer from the layer of batting which makes up Saffil alumina fiber mat, and laminated with Loctite PolySeamSeal. For comparative testing purposes, the mass of the alumina fiber mat layer was made to match the mass of the mica paper layer in Example 3. The binder, Loctite PolySeamSeal, content was approximately 23.2%. The barrier layer was combined with three layers of alumina fiber mat as insulation and a PTFE-coated fiberglass cloth gas barrier. In the Convective Exposure Test, as described herein, the lightweight multilayer flame barrier of Example 3A provided 20 seconds of protection before a $2^{nd}$ degree burn condition was measured. The components are identified in Table 8.

TABLE 8

| 1 FOIL/FIBER + CLOTH | AREAL WEIGHT OZ/YD^2 | THICKNESS IN. |
|---|---|---|
| aluminum foil | 1.30 | 0.0007 |
| alumina fiber mat | 0.69 | 0.004 |
| silica fiber cloth | 3.53 | 0.008 |
| laminate adhesive | 1.67 | 0 |
| TOTAL (theoretical) | 7.19 | 0.013 |
| TOTAL (measured) | 7.19 | 0.013 |

Example 4

A laminate as described and shown in FIG. 9 along with an outer fabric 110 was formed into a test sample specimen and evaluated as a thermal barrier. The laminate was comprised of the following, starting from the barrier surface 12: 0.001 inch thick aluminum foil 50, an insulating fabric of heat cleaned woven fiberglass cloth1080 62, available from JPS Composite Materials, Anderson, S.C., 0.0005 inch thick aluminum foil 50', 0.0007 inch thick mica paper 32, 0.0005 inch thick aluminum foil 50", 0.0007 inch thick mica paper 32', and 0.0005 inch thick aluminum foil 50'". All of the layers were bonded with PQ Corporation, Valley Forge, Pa., N Grade adhesive, diluted to 25% for easier application, reduced weight and better flexibility.

A sample specimen was made from a plurality of panels that were seamed together. The panels included the multilayer laminate and an outer fabric that were seamed together as detailed in FIG. 13, without a cover layer. The outer layer was 5.6 oz/yd$^2$ fiberglass fabric laminated to 0.007 inch thick foil to the barrier side 12 only. The intumescent layer was T6663-02 from Technical Fibre Products Inc. An intumescent material is that swells up or expands when a threshold temperature is exceeded. The Technical Fibre Products layer comprised expandable graphite.

The test specimen produced is shown in FIGS. 15 to 17. The test specimen was exposed to two Greenwood, item 91037 propane torches that produce approximately 100 k BTU each. The burners were place 10 inches from the nearest point of the outer wall of the shelter, as shown in FIGS. 18 and 19. The valve on the torches was open one full turn and the burn was initiated and continued until Series 1 temperature, as shown in FIG. 24, exceeded 150° C. Series 1 temperature is a temperature within the specimen dome that is approximately 2 inches from the ground. This simulates breathing height for someone in a fire shelter. Samples were evaluated for breaches in the seam and in the wall of the test sample. The test sample specimen performed very well, having no burns through the shelter, and no bright visual flashes where observed through an aperture in the cover on the open end of the dome. In addition, no flashes were observed on the seams most proximal to the torches and no excessive smoke was observed in the shelter.

In contrast, a test specimen made with M202 had a series 1 temperature that exceeded 150° C. within 37 seconds.

Example 5

A fire barrier fabric, such as #5 below, comprising only 3 elements including a fabric layer (e.g. JPS Style 104), a mineral layer (e.g. USSAMICA Mica Paper), and a reflective element (Alufoil 0.0005 in. thick aluminum foil).

TABLE 9

| Example # 5 FOIL/MICA/CLOTH | AREAL WEIGHT OZ/YD^2 | THICKNESS IN. |
|---|---|---|
| aluminum foil | 0.92 | 0.0005 |
| mica paper | 0.69 | 0.0009 |
| fiberglass cloth, Style 104 | 0.55 | 0.0011 |
| laminate adhesive | ~0.6 | 0 |
| TOTAL (theoretical) | 2.76 | 0.0025 |
| TOTAL (measured) | | |

Even though 3 layers of this 3-layer composite would be required to afford the same level of protection as the 7 layer multilayer construction described elsewhere in this application, the advantages of this construction are 1) Having 3 elements instead of up to 7, it is easier to fabricate because the adhesive can dry more quickly and it can be made in just 1 or 2 passes in the laminator, 2) it can be used more flexibly in applications because applications can be optimized to use just 1, 2 or 3 layers of the 3-layer composite, depending on the extremity of the environment, and other factors including cost, and 3) three 3-layer composite layers will be more flexible than one 7-layer composite layer, allowing a finished item to be stored more compactly without damage.

Example 6

Additionally, an alternate configuration of the above fire barrier fabric, such as #6 below, is possible where the mica paper and laminate adhesive layers are replaced with a mica coating that also serves as the adhesive. Exemplary mica coatings would be the Microlite HTS and Microlite HTS-XE coatings by Specialty Vermiculite Corporation, Phoenix, Ariz. Microlite comprises vermiculite.

TABLE 10

| Example # 6 FOIL/MICA/CLOTH | AREAL WEIGHT OZ/YD^2 | THICKNESS IN. |
|---|---|---|
| aluminum foil | 0.92 | 0.0005 |
| mica adhesive/coating | ~1.29 | 0.0009 |
| fiberglass cloth, Style 104 | 0.55 | 0.0011 |
| TOTAL (theoretical) | 2.76 | 0.0025 |

This system is better than the first version described in Example 5, because it is easier and less expensive to produce.

Example 7A and 7B

A fire barrier composite fabric, such as 3A below, suitable for use in the floor of fire shelters including 1) an intumescent layer designed to expand on heating and thereby seal off the floor opening so that flames and hot gasses can't enter the shelter volume under the floor, and 2) a foil layer on the inside (user side) of the fabric acting as a gas barrier against ingress of hot and/or poisonous gasses directly through the fabric. The intumescent layer offers a very practical improvement when gaps exist between the shelter floor and the ground due to uneven ground, rushed or incorrect deployment, or double occupancy, or if the shelter is deployed on top of tinder. In all of these cases, the expandable graphite in the intumescent layer expands to fill air gaps so that gasses and flames cannot pass under the shelter to the survivor's air volume, or so that fresh combustion air cannot reach the grass or dry leaves under the shelter.

The intumescent fabric layer could be the commercially available Tecnofire T6663-03 nonwoven material from Technical Fibre Products Inc. or could be made by coating fiberglass fabric (JPS Style 1080) or silica fabric (5.6 oz/yd2 silica cloth distributed by Custom Laminating Corporation) with expandable graphite such as #3626 from Asbury Graphite Mills Inc., Asbury, N.J., using a suitable adhesive.

TABLE 11

| Example #7A FOIL/INTUMESCENT FLOOR | AREAL WEIGHT OZ/YD^2 | THICKNESS IN. |
|---|---|---|
| aluminum foil | 1.84 | 0.001 |
| Tecnofire T6663-03 intumescent layer | 0.88 | 0.003 |
| laminate adhesive | ~0.3 | 0 |
| TOTAL (theoretical) | 3.02 | 0.004 |
| TOTAL (measured) | | |

A second foil layer, on the non-user side of the floor fabric as in #7B below, would block radiant heat more effectively than the single foil system described above, but leaving the intumescent layer exposed to oncoming heat would allow the intumescent layer to heat and expand more quickly in an actual fire, which would block flames and gasses more effectively. Given these trade-offs, the exposure anticipated would have to determine if a single- or double-foil system was preferred.

TABLE 12

| Example # 7B FOIL/INTUMESCENT/FOIL FLOOR | AREAL WEIGHT OZ/YD^2 | THICKNESS IN. |
|---|---|---|
| aluminum foil | 1.84 | 0.001 |
| Tecnofire T6663-03 intumescent layer | 0.88 | 0.003 |
| aluminum foil | 1.84 | 0.001 |
| laminate adhesive | ~0.6 | 0 |
| TOTAL (theoretical) | 5.16 | 0.005 |
| TOTAL (measured) | | |

Example 8A and 8B

An outer fabric as in #8A below, for fire shelters and other single-use fire protection units, comprising 3 elements: a reflective layer (e.g. Alufoil 0.0007 in. aluminum foil), an intumescing coating (e.g. Loctite PolySeamSeal adhesive @ 0.3 oz/yd² mixed with Asbury Graphite Mills Inc, expandable graphite #3626 @ 1.5 oz/yd²), and silica cloth such as the 5.6 oz/yd² silica cloth distributed by Custom Laminating Corporation.

Current fire shelter designs use foil/fabric laminates which effectively block radiation and provide structural integrity to fire shelters on exposure. Alternate designs use intumescent elements within the fire shelter insulation lay-up, which improve thermal performance but have the disadvantage of releasing poisonous and flammable gasses within the fire shelter enclosure. The proposed design would offer the advantage of intumescents, namely increasing the insulation value of the shelter lay-up on exposure to heat while releasing the byproducts of the graphite's expansion outside of the shelter envelope.

TABLE 13

| Example # 8A FOIL/INTUMESCENT/FABRIC OUTER FABRIC | AREAL WEIGHT OZ/YD^2 | THICKNESS IN. |
|---|---|---|
| aluminum foil | 1.8 | 0.001 |
| Intumescent coating with Asbury #3626 | 1.8 | 0.008 |
| silica cloth distributed by Custom Laminating Corporation | 5.6 | 0.007 |
| TOTAL (theoretical) | 9.2 | 0.016 |
| TOTAL (measured) | | |

A second foil, as in #8B below, located on the inside of the fabric could be optionally located on the inside fabric layer to further ensure that the gasses released by the expanding graphite would go outside the shelter instead of inside.

TABLE 14

| Example # 8B FOIL/INTUMESCENT/FABRIC/FOIL OUTER FABRIC | AREAL WEIGHT OZ/YD^2 | THICKNESS IN. |
|---|---|---|
| aluminum foil | 1.8 | 0.001 |
| Intumescent coating with Asbury #3628 | 1.8 | 0.008 |
| silica cloth distributed by Custom Laminating Corporation | 5.6 | 0.007 |
| aluminum foil | 1.8 | 0.001 |
| laminate adhesive | ~0.3 | 0 |
| TOTAL (theoretical) | 11.3 | 0.017 |
| TOTAL (measured) | | |

Example 9

An alternative adhesive to N Grade adhesive made by PQ Corporation is the Microlite series of vermiculite dispersions from Specialty Vermiculite Corporation. Specifically, Microlite HTS and Microlite HTS-XE have been successfully used to bond foil, mica paper and fabric, and foil and fabric. It appears to remain more flexible than the N-Grade adhesive following exposure to ~1500° F. for 120 seconds using a Meeker burner, although it's bond strength may not be as good. It is believed that this adhesive would be a good alternative adhesive used in the 7-element barrier described elsewhere, and re-listed below as #9.

TABLE 15

| Example #9 4 FOIL/MICA + CLOTH | AREAL WEIGHT OZ/YD^2 | THICKNESS IN. |
|---|---|---|
| aluminum foil | 0.92 | 0.0005 |
| mica paper | 0.69 | 0.0009 |
| aluminum foil | 0.92 | 0.0005 |
| mica paper | 0.69 | 0.0009 |
| aluminum foil | 0.92 | 0.0005 |
| fiberglass cloth, Style 1080 | 1.45 | 0.0022 |
| aluminum foil | 1.84 | 0.001 |
| laminate adhesive | ~1.0 | 0 |
| TOTAL (theoretical) | 8.43 | 0.007 |
| TOTAL (measured) | 11.4 | 0.008 |

The Asbury Expandable flake 3626 has the following properties:

TABLE 16

| Expandable Flake 3626 | |
|---|---|
| % Moisture | 0.62 |
| % Sulfur | 2.984 |
| % ExpCarb | 91.9 |
| % +20 Mesh (850 Micron) | 0 |
| % +40 Mesh (425 Micron) | 0.12 |
| % +60 Mesh (250 Micron) | 1.71 |
| % +70 Mesh (212 Micron) | 4.84 |
| % +80 Mesh (180 Micron) | 18.26 |
| % +100 Mesh (150 Micron) | 24.85 |
| % +200 Mesh (75 Micron) | 45.63 |
| % +325 Mesh (44 Micron) | 3.41 |
| % −325 Mesh (44 Micron) | 1.18 |
| Bulk Density lb/ft3 | 29.5 |
| Expansion Ratio X:1 | 158 |
| pH | 6.94 |

The JPS E-Glass, Style 104 has the following properties.

TABLE 17

| STYLE 104 Material: | | US System | SI Units |
|---|---|---|---|
| Type of Yarns | | | |
| Warp Yarn | Warp Yarn | ECD 900 1/0 | EC5 5.5 |
| Fill Yarn: | Fill Yarn | ECD 1800 1/0 | EC5 2.8 |
| Fabric Weight | | 0.55 oz/yd2 | 19 g/m2 |
| Weave Style | Plain | | |
| Nominal Construction | | | |
| Warp Count | | 60/in | 23.6/cm |
| Fill Count | | 52/in | 20.5/cm |
| Fabric Thickness | | 1.1 mils | 0.03 mm |
| Yarn Breaking Strength | Warp | 60 lbf/in | 53 daN/5 cm |
| Yarn Breaking Strength | Filling | 50 lbf/in | 44 daN/5 cm |
| Specifications | AMS 3824C | MIL-Y-1140 | IPC 4412 |

Microlite has the following properties:

TABLE 18

| MicroLite Dispersions Typical Physical Properties | | | | | | | | |
|---|---|---|---|---|---|---|---|---|
| Style | 903 | HTS | 923 | 963 | HTS XE | HTS XE20 | HTS SE | Micro-White |
| % Solids | 7.5 | 15 | 7.5 | 7.5 | 15.5 | 17.5 | 15 | 15 |
| Viscosity (cps) | 700 | 6600 | 250 | 220 | 5100 | 4500 | 4500 | 2500 |
| Tensile Strength (psi) | 6000 | 5000 | 8000 | 10,000 | 5500 | 6500 | 5000 | 2500 |
| % OSP (less than or equal to) | 28 | 33 | 15 | 8 | 33 | 33 | 33 | 33 |
| % Organic | 0 | 0 | 0 | 0 | low | higher | low | low |
| pH | 7 to 9 | 7 to 9 | 7 to 9 | 7 to 9 | 6.5 to 8.5 | 6.5 to 8.5 | 6.5 to 8.5 | 6.5 to 8.5 |
| Bulk Density | 1.05 | 1.05 | 1.05 | 1.05 | 1.05 | 1.05 | 1.05 | 1.05 |
| % Elongation | 2 | 2 | 2 | 2 | 2 | 2 | 2 | 2 |

Microlite has the following particle size distribution:

TABLE 19

| US Mesh Size | Screen Aperture (mm) | % Retained by Weight |
|---|---|---|
| 80 | 0.18 | 30-70 |
| 100 | 0.15 | 0-20 |
| 140 | 0.112 | 0-20 |
| 200 | 0.075 | 0-30 |
| 325 | 0.045 | 0-30 |
| Pan | — | 0-10 |

The summary of the invention is provided as a general introduction to some of the embodiments of the invention, and is not intended to be limiting. Additional example embodiments including variations and alternative configurations of the invention are provided herein.

BRIEF DESCRIPTION OF THE DRAWINGS

The accompanying drawings are included to provide a further understanding of the invention and are incorporated in and constitute a part of this specification, illustrate embodiments of the invention, and together with the description serve to explain the principles of the invention.

Figure 1:
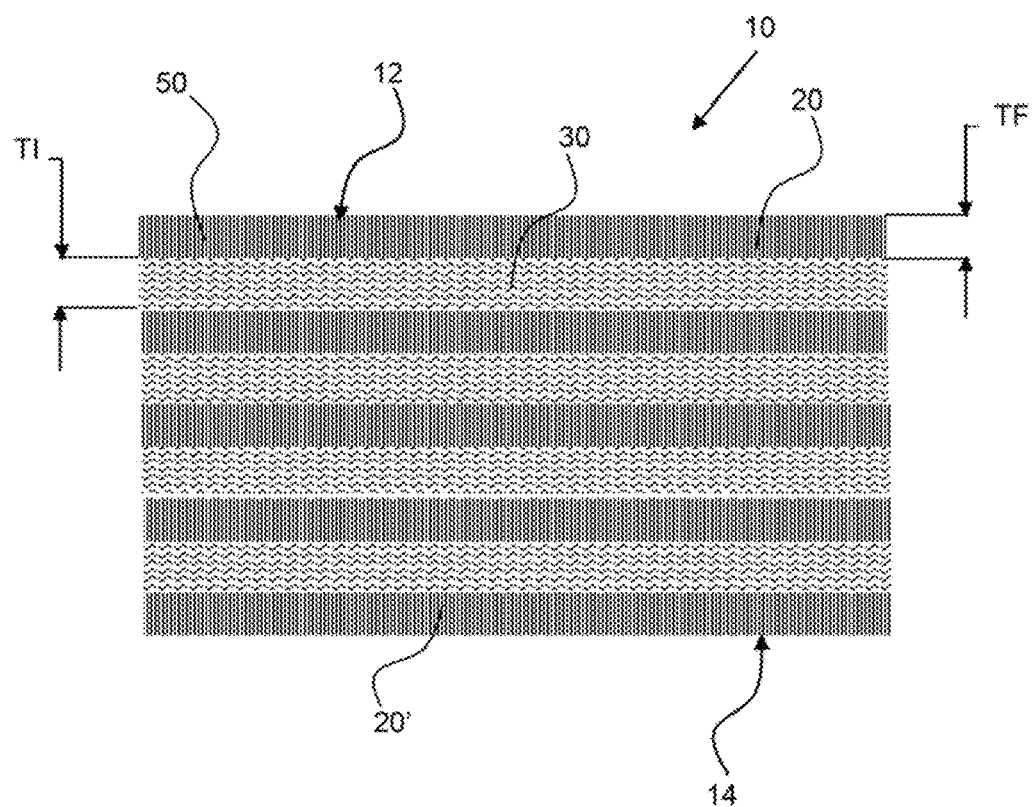
FIG. 1 shows an exemplary lightweight multilayer flame barrier having a barrier layer comprising alternating layers of a metal foil and an insulation layer.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Definitions

Fold durable, as used herein, means that a multilayer flame barrier can be folded over upon itself and then unfolded and have no substantial loss in fire barrier performance properties, wherein the folded and unfolded section has no less than 80% of the fire barrier performance of the same multilayer flame barrier material that was not folded. For example, the time to reach 150° C., for a multilayer flame barrier material that was not folded may be 100 seconds and for this multilayer flame barrier material to be fold durable, the time to reach 150° C. for a folded and unfolded sample must be 80 seconds or more.

An outer layer with respect to a mica paper layer, as used herein, is a layer of material, such as a fabric layer, a foil layer, or another mica paper layer that is on the barrier, or outer side of the mica paper layer.

An inner layer with respect to a mica paper layer, as used herein, is a layer of material, such as a fabric layer, a foil layer, or another mica paper layer that is on the inner side of the mica paper layer, or closer to an enclosure formed by a multilayer flame barrier.

As shown in FIG. 1, an exemplary lightweight multilayer flame barrier 10 has a barrier layer 20 comprising alternating layers of a metal foil 50 and an insulation layer 30. An adhesive 40 attaches the metal foil layer to the insulation layer. This exemplary barrier layer 20 comprises nine layers, five metal foil layers and four insulation layers. The metal foil may be an aluminum foil and the insulation layer may be a mica paper. The thickness of the metal foil layer TF may be less than 25 µm and the thickness of the insulation layer TL may also be less than 25 µm. A metal foil layer 20 and 20' are on either side of the barrier layer. This construction is symmetric having a metal foil layer on the barrier surface 12, or surface configured to be exposed to a flame and a metal foil on the inside surface 14, or surface of the interior of a shelter or garment.

Figure 2A:
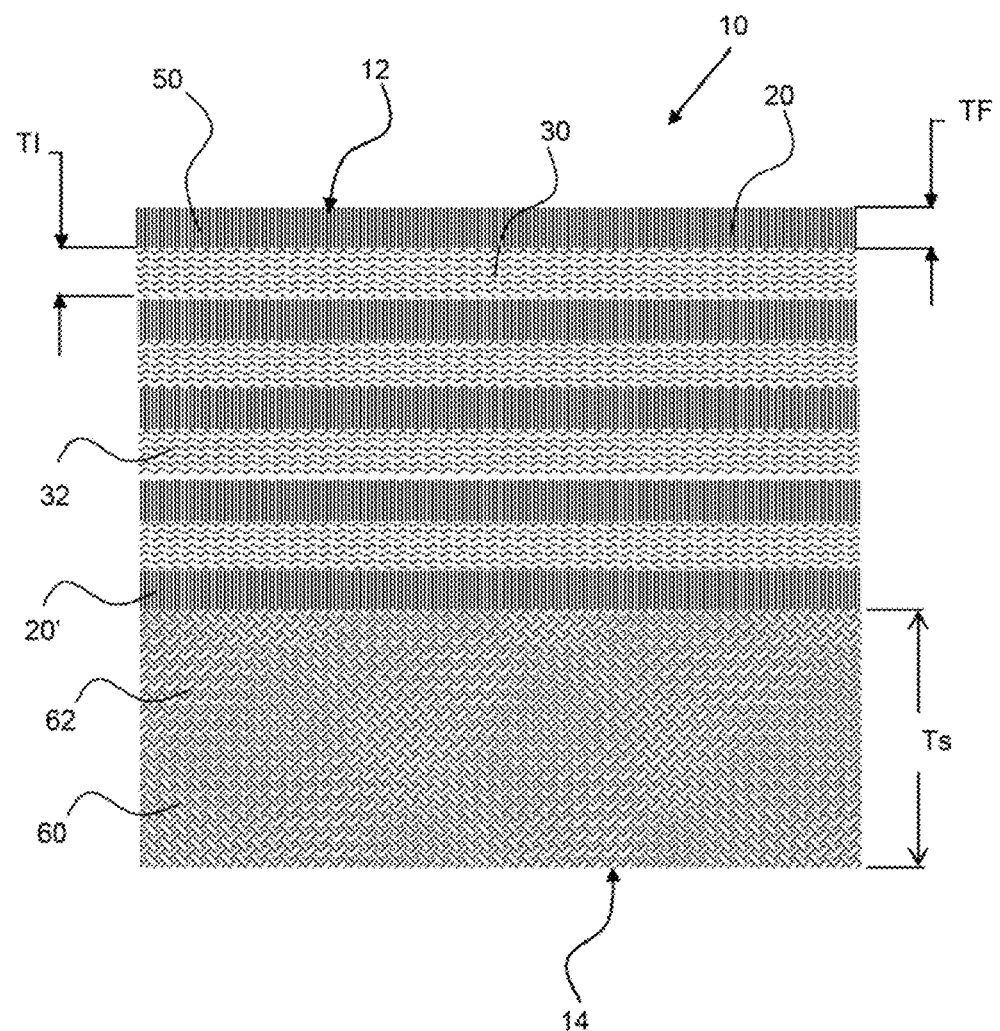
FIGS. 2A and 2B show an exemplary lightweight multilayer flame barrier having a barrier layer attached to a support layer.

As shown in FIG. 2A, an exemplary lightweight multilayer flame barrier 10 has a barrier layer 20 attached to a support layer 62. The support layer may be a fiberglass fabric 62 and have a thickness TS.

Figure 2B:
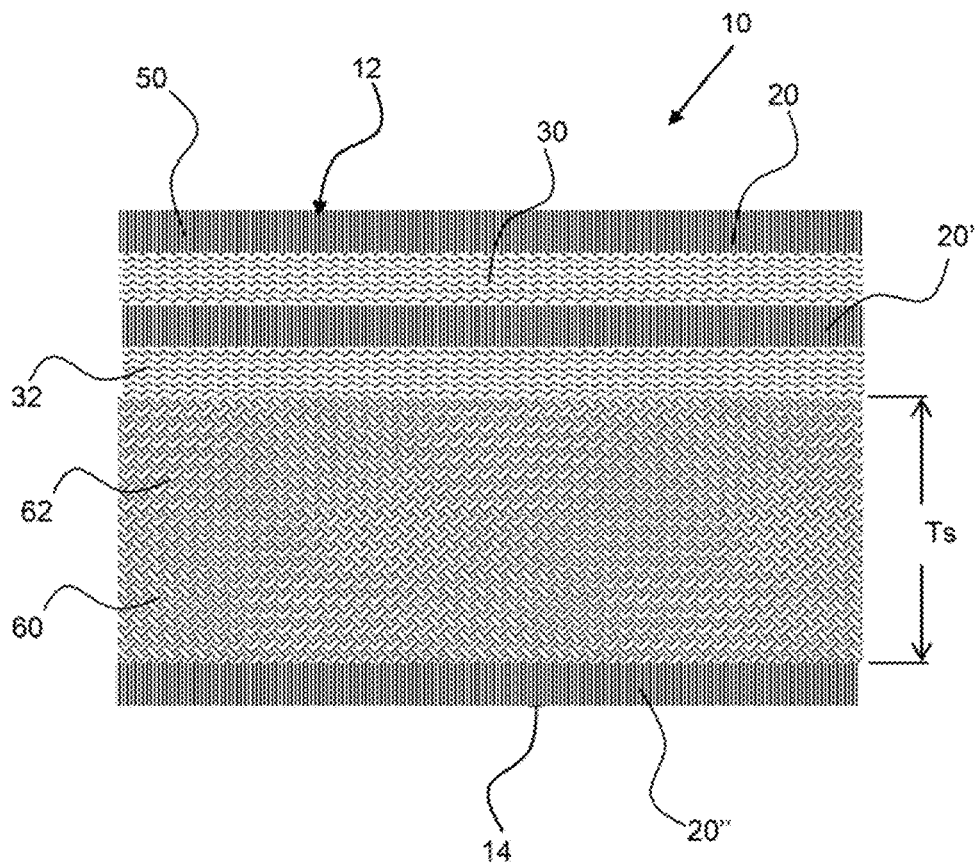

As shown in FIG. 2B, an exemplary lightweight multilayer flame barrier 10 has a barrier layer 20 attached to a support layer 62. The barrier layer 20 comprises alternating layers of a metal foil 20, 20' with insulation layers 30. The support layer 60, a fiberglass fabric 62 in this embodiment is attached to an insulation layer of the barrier layer. A gas barrier layer, or metal foil layer 20" is attached to the support layer on the inside surface 14. A metal foil is on the barrier surface 12 to reflect heat.

Figure 3:
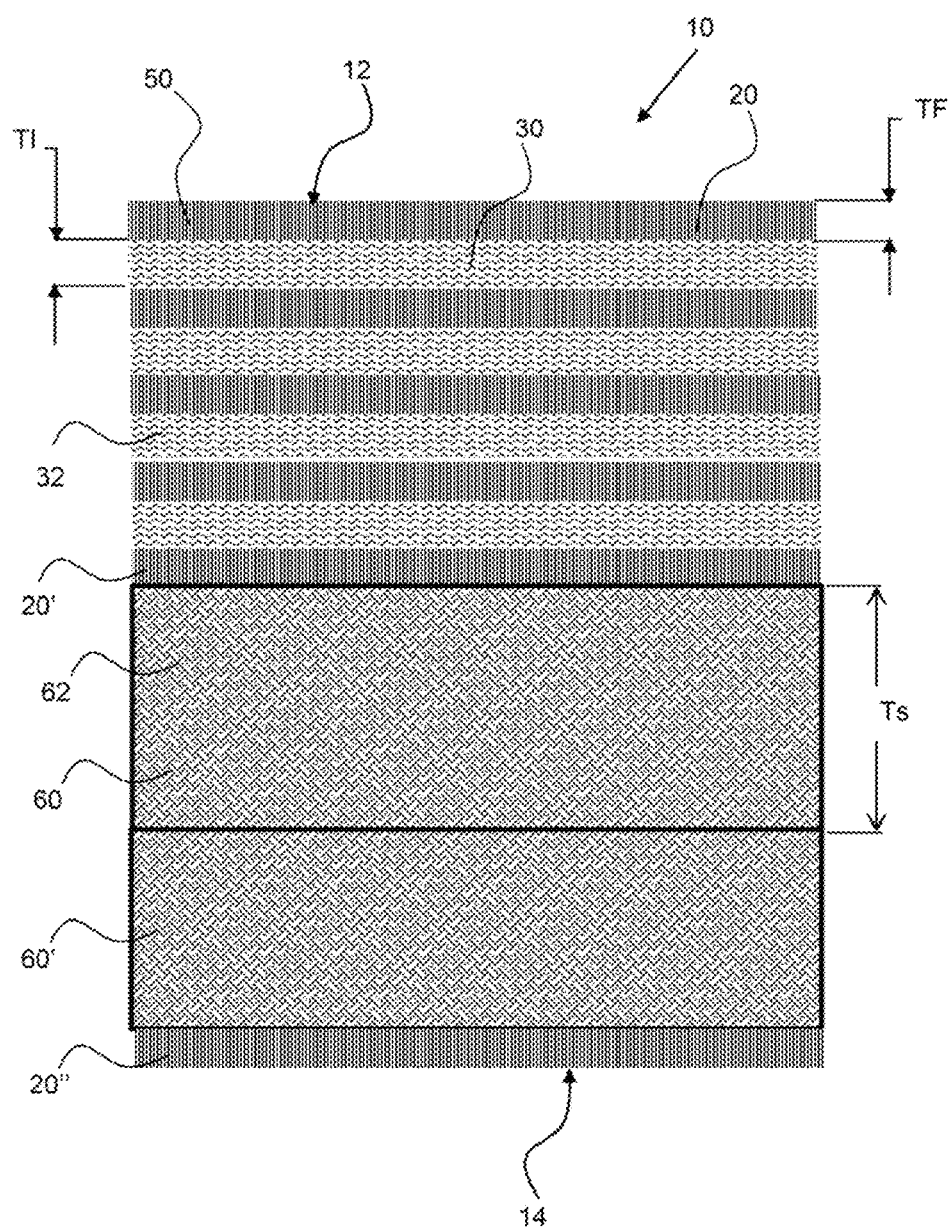
FIG. 3 shows an exemplary lightweight multilayer flame barrier having a barrier layer attached to a support layer.

As shown in FIG. 3, an exemplary lightweight multilayer flame barrier 10 has a barrier layer 20 attached to a support layer 60 comprising multiple layers of a fiberglass fabric 62.

Figure 4:
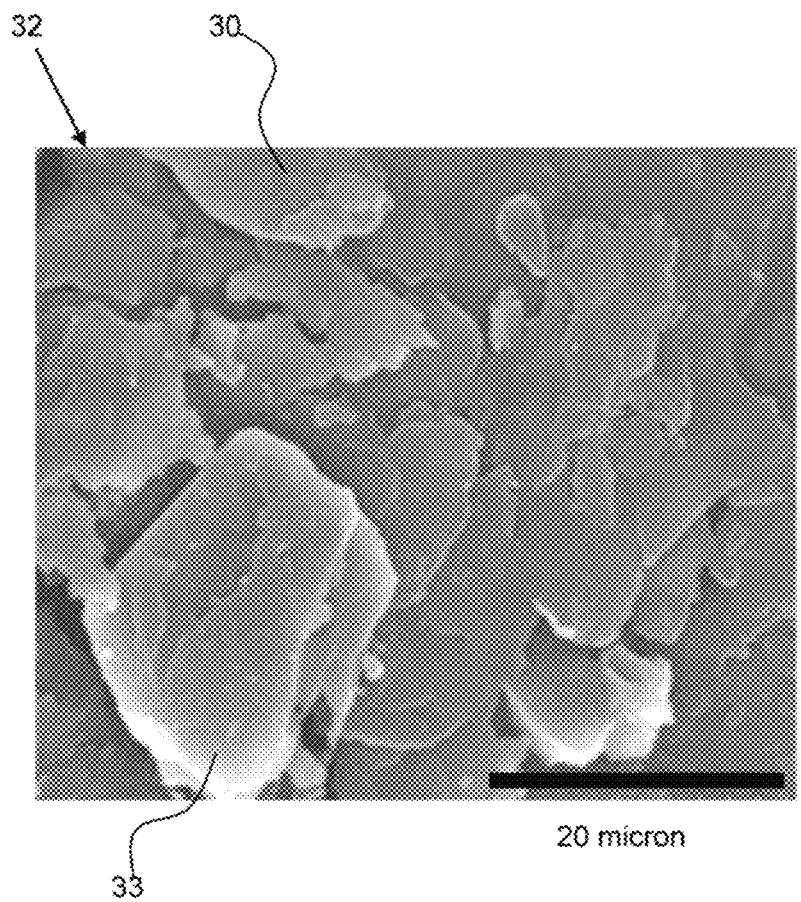
FIG. 4 shows a scanning electron micrograph (SEM), of an exemplary mica paper having a plurality of mica flakes in parallel with each other.

FIG. 4 shows a scanning electron micrograph (SEM), of an exemplary mica paper 323 having a plurality of mica flakes 33 in parallel with each other. The black bar represents 20 µm.

Figure 5:
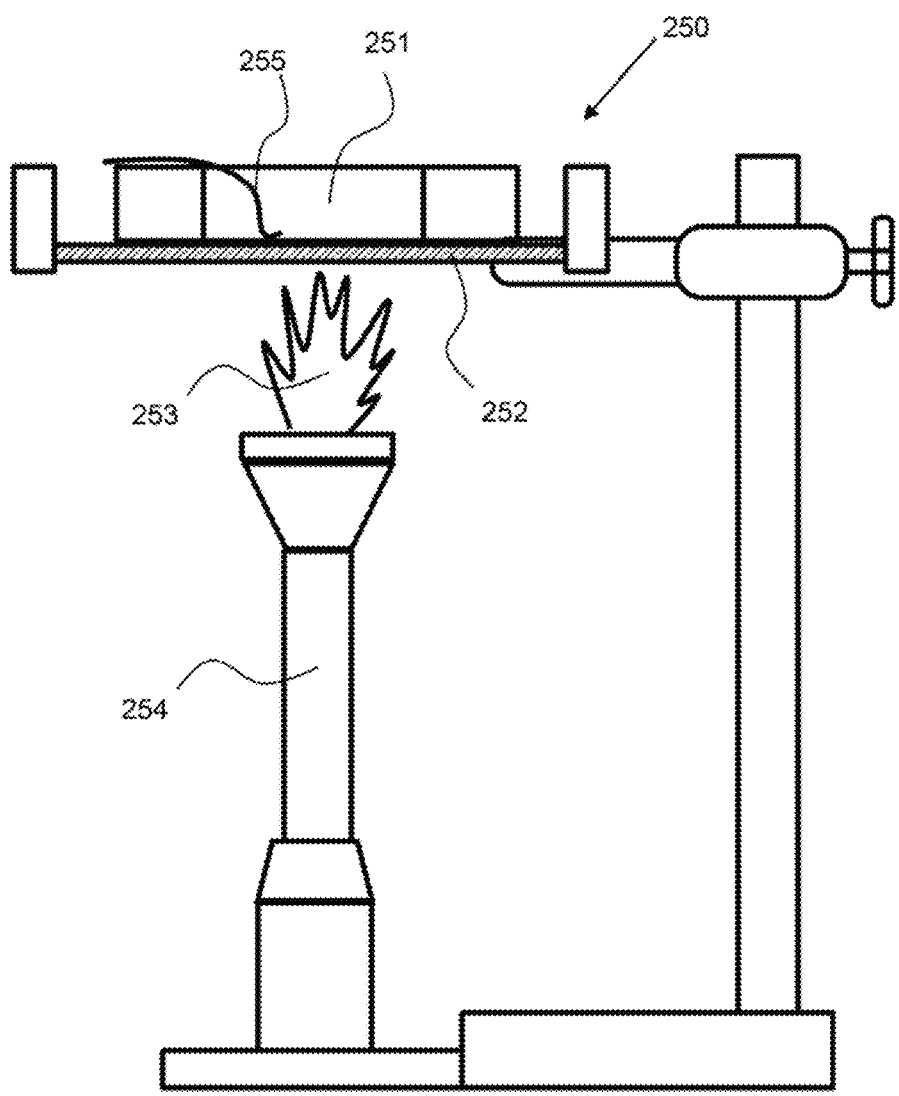
FIG. 5 shows a diagram of an exemplary flame barrier test.

FIG. 5 shows a diagram of an exemplary flame barrier test 250. The specimen 252 is clamped to a housing above a burner 254 and a thermocouple 255 is configured to measure the temperature of the back side of the specimen. A calorimeter 251 is also configured on the back-side of the specimen. The burner is lit and the flame 253 is exposed to the specimen. The temperature as a function of time or the heat energy as a function of time may be measured in this test.

Figures 6, 7:
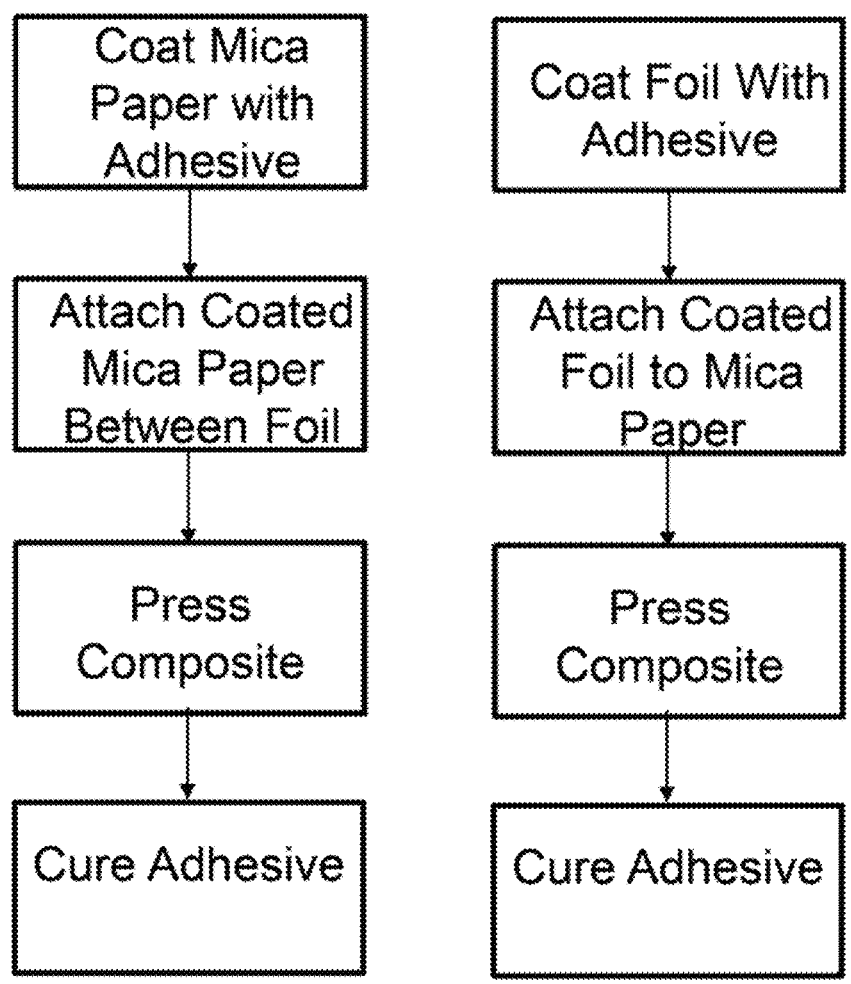
FIG. 6 shows a flow chart of a method to make an exemplary lightweight multilayer flame barrier.
FIG. 7 shows a flow chart of a method to make an exemplary lightweight multilayer flame barrier.

FIG. 6 shows a flow chart of a method to make an exemplary lightweight multilayer flame barrier. Layers of an insulation layer, mica paper, is coated with an adhesive, attached between layers of metal foil and then pressed and the adhesive is set such as cured by heat.

FIG. 7 shows a flow chart of a method to make an exemplary lightweight multilayer flame barrier wherein the adhesive is coated onto a metal foil layer before being coupled with an insulation layer, pressed together or compressed and then cured.

Figure 8:
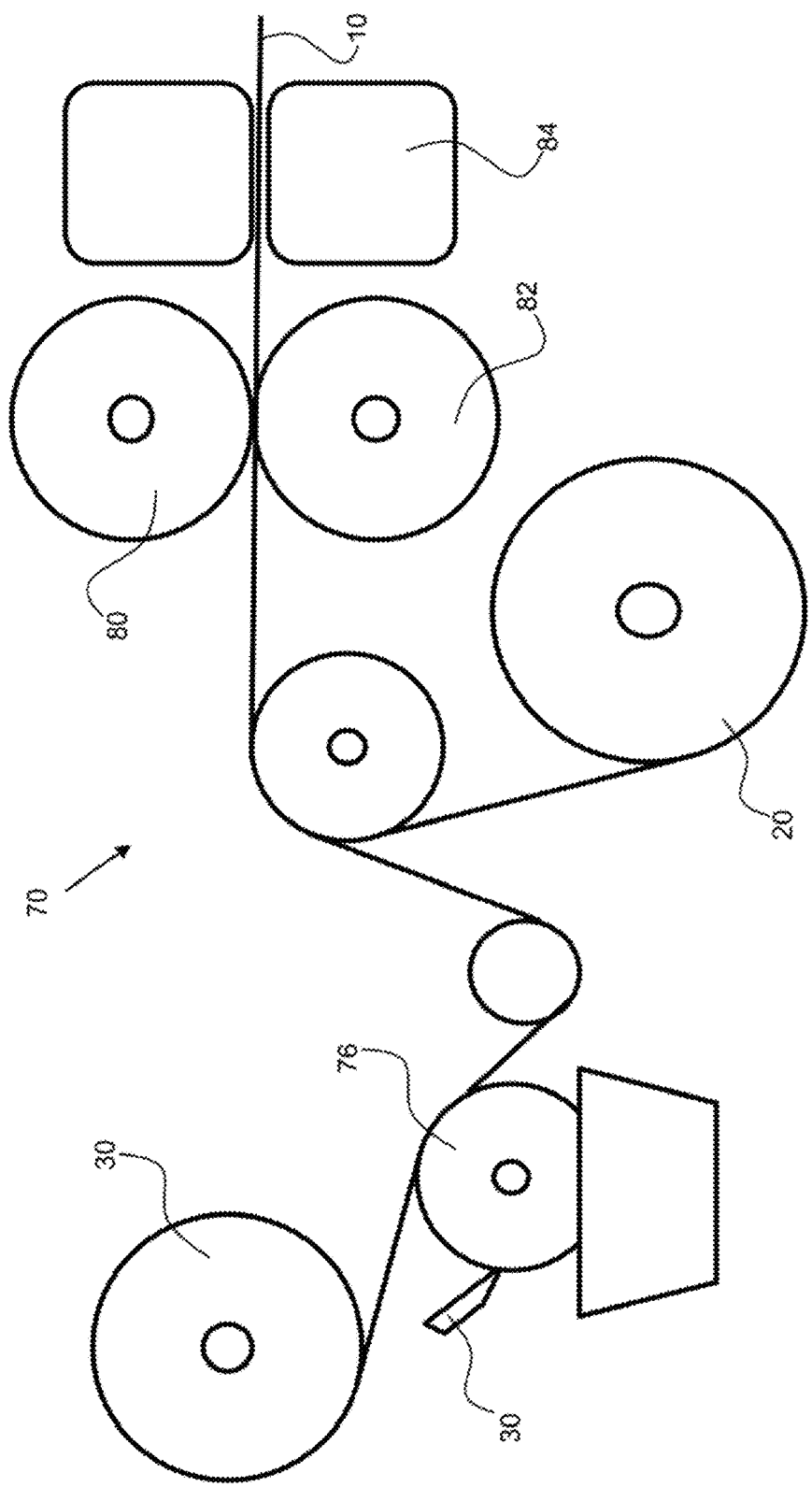
FIG. 8 shows a diagram of an exemplary process for making an exemplary lightweight multilayer flame barrier.

As shown in FIG. 8, a diagram of an exemplary lamination process 70 comprises a coating roller 76 that transfers an adhesive 40 to an insulation layer 30. The insulation layer then couples with two metal foil layers 20, 20'. The three layer barrier layer 20 is then passed through two rollers, a first roller 80 and a pinch roller that press the three layers together. The barrier layer is then passed through an oven 84 where the adhesive is cured.

Figure 9:
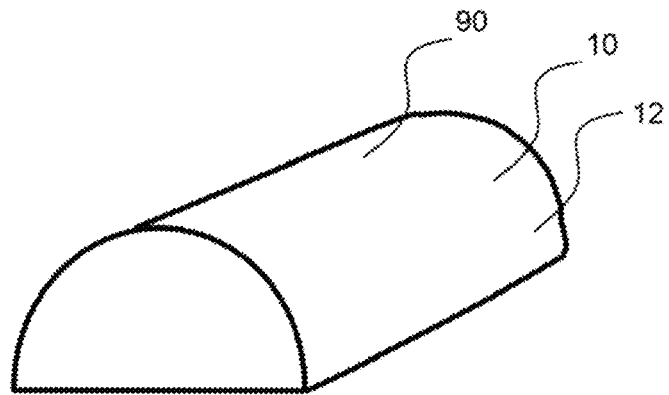
FIG. 9 shows an exemplary portable fire shelter comprising an lightweight multilayer flame barrier as described herein.

As shown in FIG. 9, an exemplary portable fire shelter 90 comprises a lightweight multilayer flame barrier 10 as described herein. A portable fire shelter, or the fabric thereof, may consist essentially of the lightweight multilayer flame barrier 10, as described herein.

Figure 10:
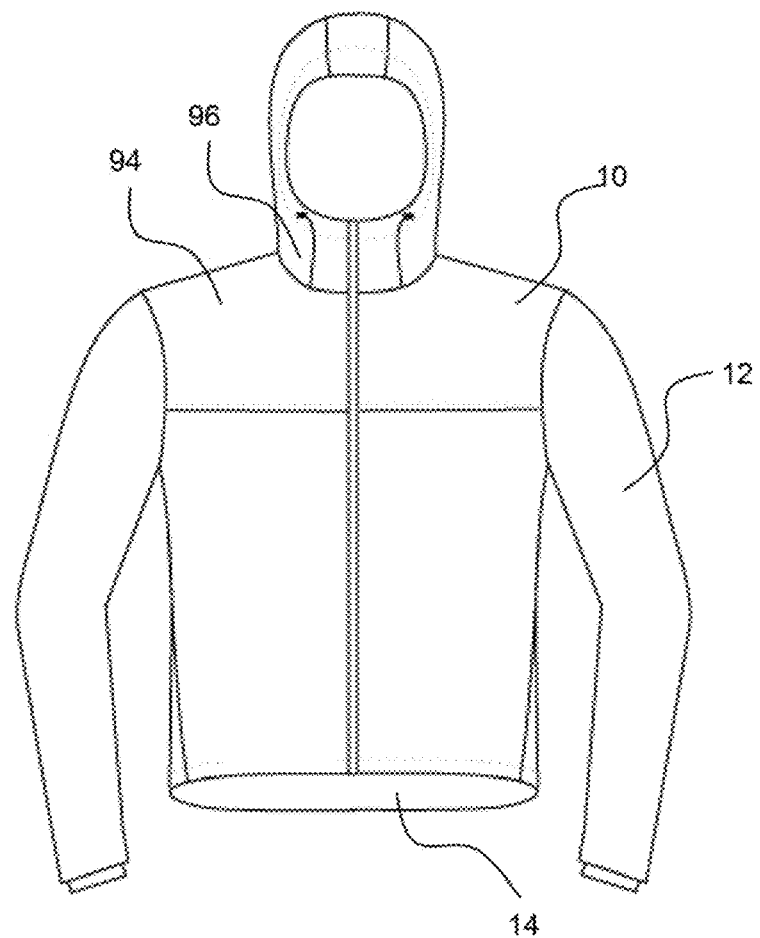
FIG. 10 shows an exemplary fire protection jacket comprising an lightweight multilayer flame barrier as described herein.

As shown in FIG. 10, show an exemplary fire protection jacket 96 comprises a lightweight multilayer flame barrier 10 as described herein. The garment 94 may consist essentially of the lightweight multilayer flame barrier 10, as described herein, wherein closures do not comprise lightweight multilayer flame barrier.

Figure 11:
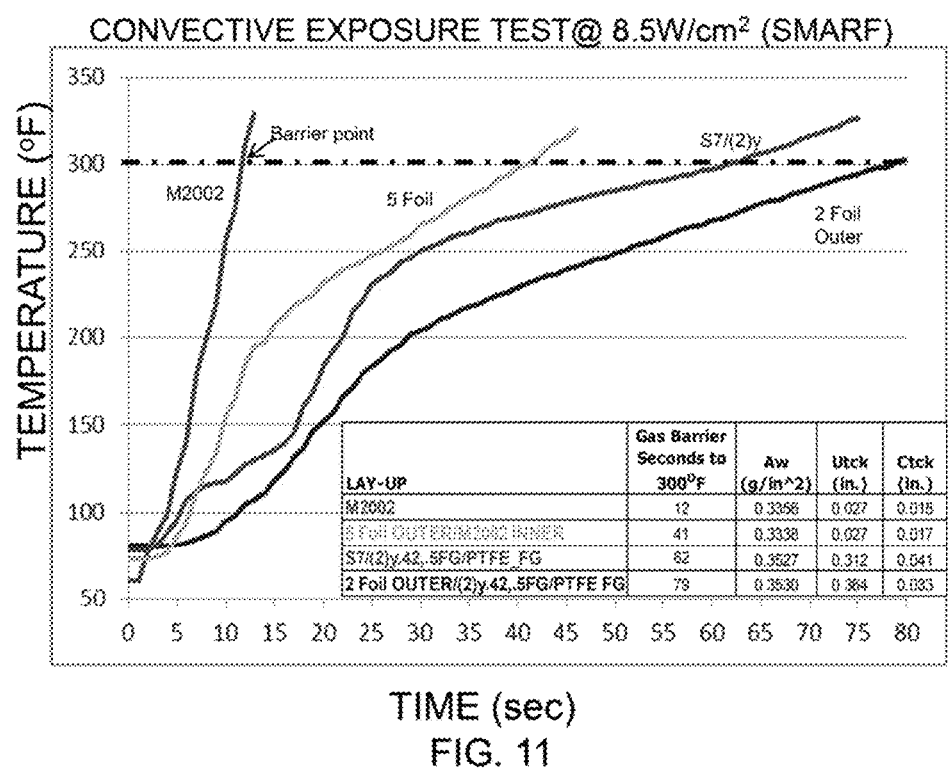
FIG. 11 shows a graph of the temperature versus time for a number of example embodiments and comparative examples.

FIG. 11 shows a graph of the temperature versus time for a number of example embodiments and comparative examples as tested under the Convective Exposure Test. Utck is uncompressed thickness, indicating the insulating ability of the material, and Ctck is the thickness with approximately 9.8 PSI, indicating the ability of the material to be compressed for storage.

Figure 12:
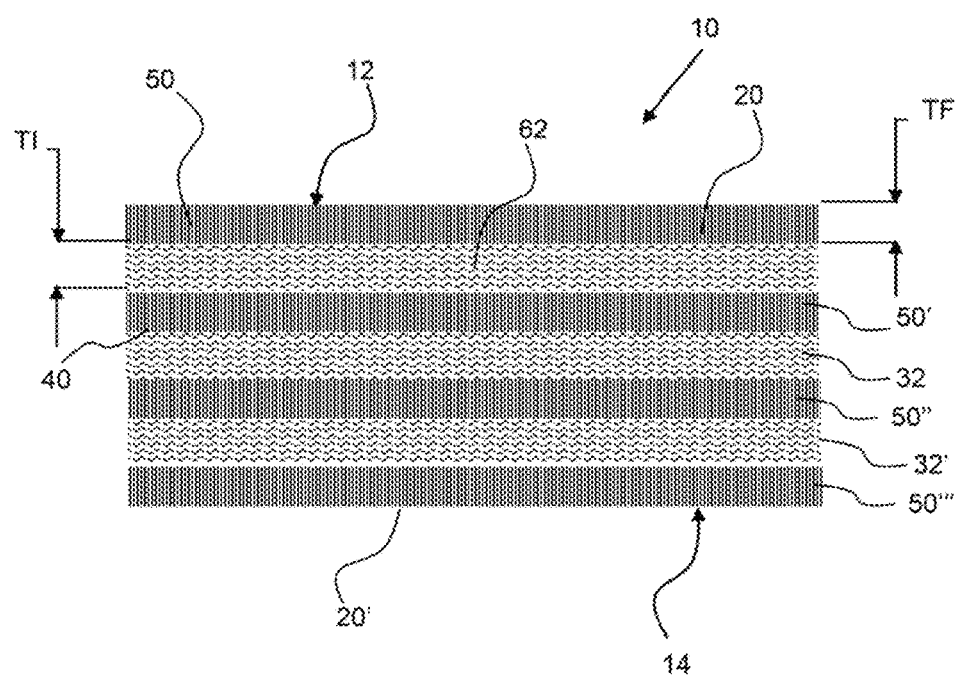
FIG. 12 shows an exemplary lightweight multilayer flame barrier having a barrier layer comprising alternating layers of a metal foil and an insulation layer that was evaluated in Example 4, as described herein.

FIG. 12 shows an exemplary lightweight multilayer flame barrier having a barrier layer comprising alternating layers of a metal foil and an insulation layer that was evaluated in Example 4, as described herein. The laminate was comprised of the following, starting from the barrier surface 12 and as detailed in Table 9 below: 0.001 inch thick aluminum foil 50, an insulating fabric of heat cleaned woven fiberglass cloth1080 62 available from JPS Composite Materials, Anderson, S.C., 0.0005 inch thick aluminum foil 50', 0.0007 inch thick mica paper 32, 0.0005 inch thick aluminum foil 50", 0.0007 inch thick mica paper 32', and 0.0005 inch thick aluminum foil 50". All of the layers were bonded with PQ Corporation, Valley Forge, Pa., N Grade adhesive 40, diluted to 25% for easier application, reduced weight and better flexibility. The heat cleaned woven fiberglass was heated at about 1000° F. for about 2 hours to drive off any organic material.

TABLE 9

Exemplary Multilayer Laminate

| Example #3<br>4 FOIL/MICA + CLOTH | AREAL<br>WEIGHT<br>OZ/YD$^2$ | THICKNESS<br>IN. |
|---|---|---|
| aluminum foil | 0.92 | 0.0005 |
| mica paper | 0.69 | 0.0009 |
| aluminum foil | 0.92 | 0.0005 |
| mica paper | 0.69 | 0.0009 |
| aluminum foil | 0.92 | 0.0005 |
| fiberglass cloth, Style 1080 | 1.45 | 0.0022 |
| aluminum foil | 1.84 | 0.001 |
| laminate adhesive | ~1.0 | 0 |
| TOTAL (theoretical) | 8.43 | 0.007 |
| TOTAL (measured) | 11.4 | 0.008 |

Figure 13:
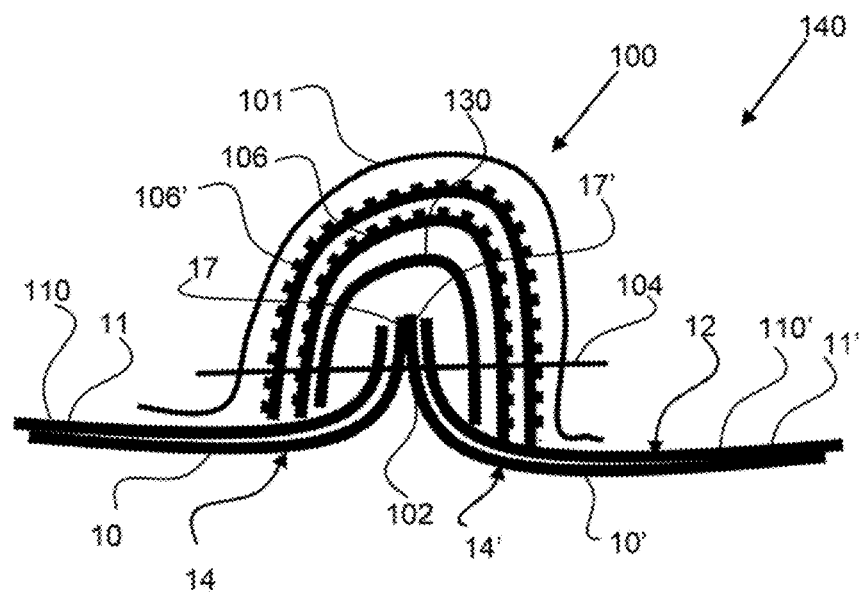
FIGS. 13 and 14 show exemplary seams for joining panels of multilayer flame barriers as described herein.
Figure 14:
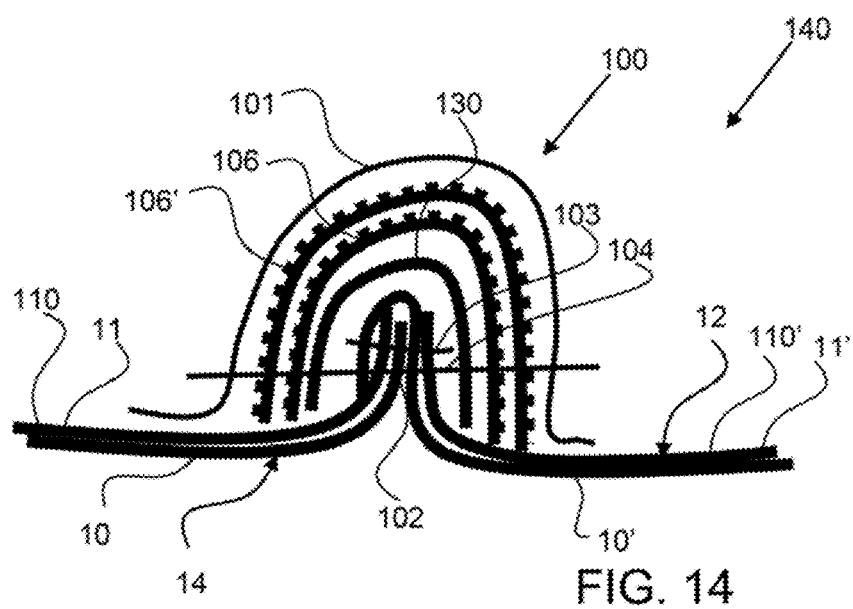

FIGS. 13 and 14 show exemplary seams for joining panels of multilayer flame barriers as described herein. As shown in FIG. 13, a seam joins two laminate panels 11, 11' together. Each of the panels comprises a multilayer laminate 10, 10', and an outer fabric 110, 110' that may be bonded by an adhesive such as PQ Corporation, Valley Forge, Pa., N Grade adhesive, diluted to 25% for easier application, reduced weight and better flexibility. The outer fabric may be a 5.6 oz/yd2 woven fiberglass with a 0.007 inch thick aluminum foil laminated to the barrier side. The two edges of the panels 17, 17' are brought together to from a seam tab 102, wherein the inside surfaces 14, 14' are brought together and extend toward the exterior or barrier surface 12. A seam tab may extend out substantially perpendicular to the barrier surface 12. A separate piece of the multilayer laminate, or a multilayer laminate seam cover 130, is configured over the seam tab. The multilayer laminate seam cover 130 extends over the edges 17,17' of the laminate panels and down the seam tab 102 toward the barrier surface 12 of the two laminate panels. One or more layers of intumescent material 106 are configured over the multilayer laminate seam cover 130. The intumescent material will expand when expose to a threshold temperature and therefor helps to prevent heat and flame from penetrating into the seam and into the interior of the flame barrier 140. A seam cover layer 101 is configured over the intumescent material. A seam stitch is configured through the seam tab and the cover layers including the multilayer laminate seam cover 130, the intumescent cover layers 106, 106' and the seam cover 101. A shown in FIG. 14, the multilayer laminate portion of laminate panel 11' is folded over the edge of laminate panel 11 in the seam tab 102. The outer fabric 110' of the second laminate panel 11' extends into the seam tab 102 but does not fold over the edge of laminate panel 11. Note that the entire second laminate panel 11' may also fold over the edge of the first laminate panel 11. The two laminate panels are attached by a tab stitch 103 that extends through the two laminate panels in the seam tab. The seam tab 102, the multilayer laminate seam cover 130, the intumescent layers 106, 106' and the cover layer 101 are all secured together with a seam stitch 104. The seam stitch and/or tab stitch may be a quartz thread or a stainless steel stranded wire, for example, such as stranded stainless steel wire that is 0.012.

Figure 15:
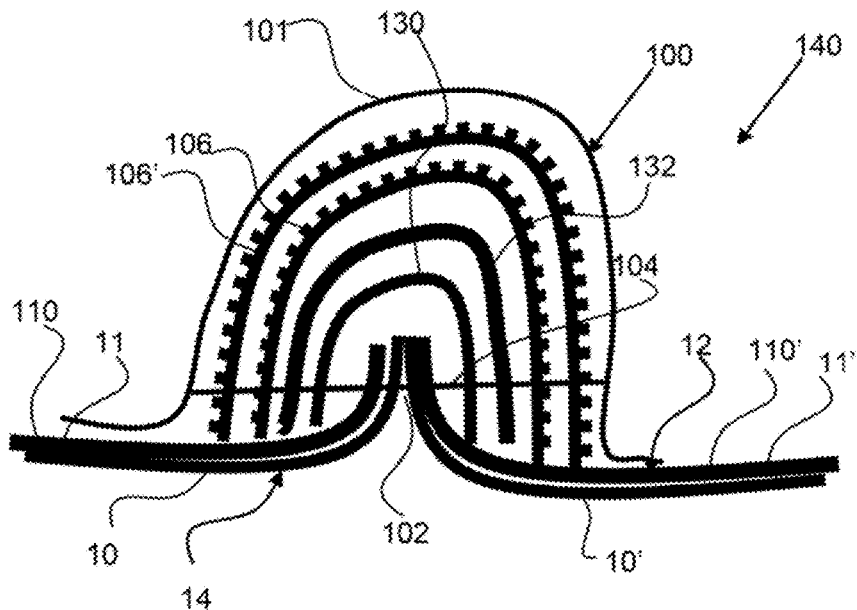
FIGS. 15 and 16 show exemplary seams for joining panels of multilayer flame barriers having an outer layer configured in the seam, as described herein.
Figure 16:
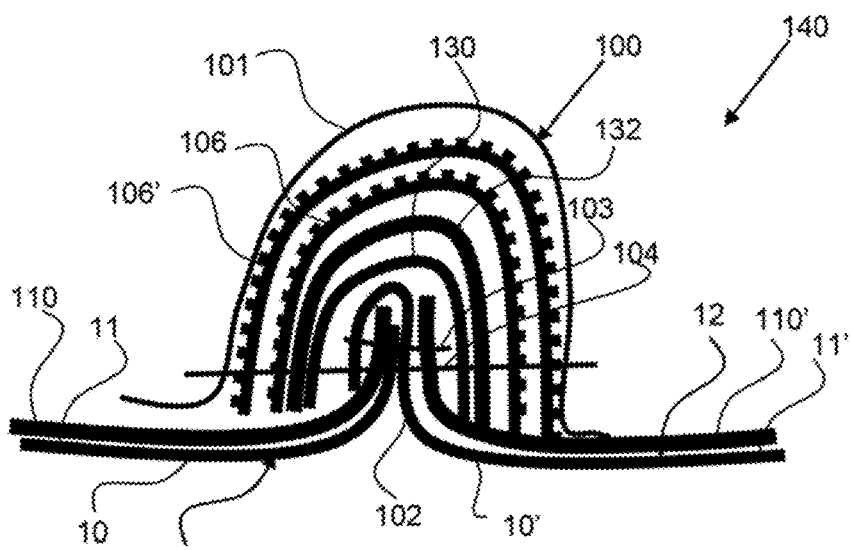

FIGS. 15 and 16 show exemplary seams for joining panels of multilayer flame barriers as described herein. In these exemplary seams, a layer of the outer layer fabric 100" is configured over the layer of multilayer laminate. The outer fabric was a 5.6 oz/yd2 woven fiberglass with a 0.007 inch thick aluminum foil laminated to the barrier side. The two edges of the panels 11, 11' are brought together to from a seam tab 102, wherein the inside surfaces 14 are brought together and extend toward the exterior or barrier surface side 12. A seam tab may extend out substantially perpendicular to the barrier surface 12. A multilayer laminate seam cover 130, which may be the construction of the multilayer laminate material of the laminate panel 11 is configured over the seam tab as well as a layer of the outer fabric or an outer fabric seam cover 132. The multilayer laminate seam cover 130 and the outer fabric seam cover 132 are configured over the seam tab and may also be bonded together by an adhesive. One or more layers of intumescent material 106 are configured over the multilayer laminate seam cover 130. A seam cover layer 101 is configured over the intumescent material. A seam stitch is configured through the seam tab and the cover layers including the multilayer laminate seam cover 130, the outer fabric seam cover 132, the intumescent cover layers 106, 106' and the seam cover 101. All of the layers configured over the seam tab, the multilayer laminate, the outer fabric, the intumescent material, and the seam cover may be bonded together with an adhesive. A shown in FIG. 16, the multilayer laminate portion of laminate panel 11' is folded over the edge of laminate panel 11 in the seam tab 102. The outer fabric 110' of laminate panel 11' extends into the seam tab 102 but does not fold over the edge of laminate panel 11. The two laminate panels are attached by a tab stitch 103. The seam tab 102, the multilayer laminate seam cover 130, the outer fabric seam cover 132, the intumescent layers 106, 106' and the cover layer 101 are all secured together with a seam stitch 104. The intumescent material will expand when expose to a threshold temperature and therefor helps to prevent heat and flame from penetrating into the seam and into the interior of the fire barrier. The seam stitch and/or tab stitch may be a quartz thread or a stainless steel stranded wire, for example, such as stranded stainless steel wire that is 0.012. The cover layer 101 may be made out of a material that degrades thermally before the threshold temperature of the intumescent material, thereby allowing the intumescent material to readily expand when reaching a threshold expansion temperature.

Figure 17:
FIGS. 17 and 18 show a test sample specimen as used in fire barrier testing detailed in Example 4.
Figure 18:
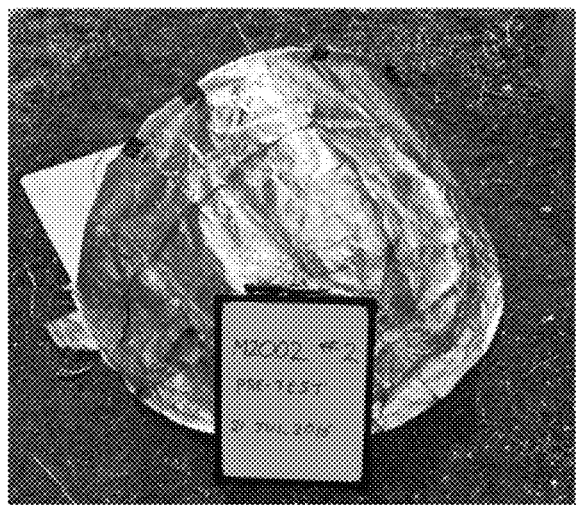

FIGS. 17 and 18 show a test sample specimen as used in fire barrier testing detailed in Example 4. The test sample specimen is a dome shape with an open end for configuring analytical equipment in or on the dome, such as thermocouples, cameras and the like. A cover is shown sealing off the open end of the test sample specimen and having apertures for analytical equipment.

Figure 19:
FIG. 19 shows a test sample specimen in a shroud for testing according to Example 4.

FIG. 19 show a test sample specimen in a shroud for testing according to Example 4.

Figure 20:
FIGS. 20 and 21 show a test of a test sample specimen as described in Example 4.
Figure 21:

FIGS. 20 and 21 show a test of a test sample specimen as described in Example 4. The burners are configured to expose the test sample specimen to direct flame.

Figure 22:
FIGS. 22 to 24 show photographs of the test sample specimen after fire barrier testing.
Figure 24:
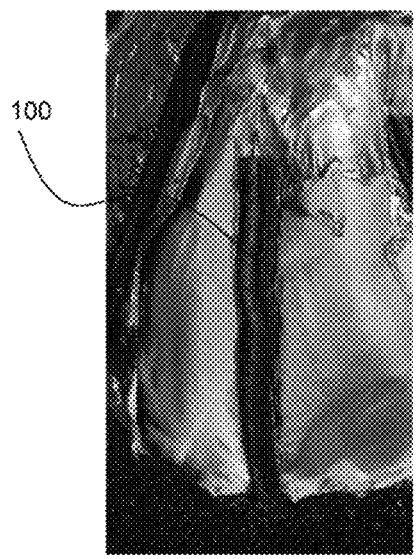
Figure 23:
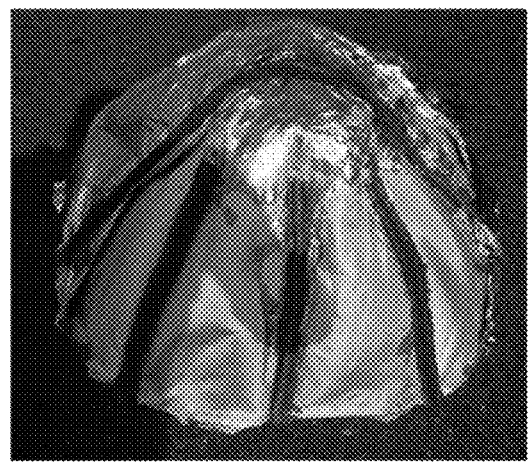

FIGS. 22 to 24 show photographs of the test sample specimen after fire barrier testing. The test sample specimen as described in Example 4 held up very well to the test. The seams were intact.

Figure 25:
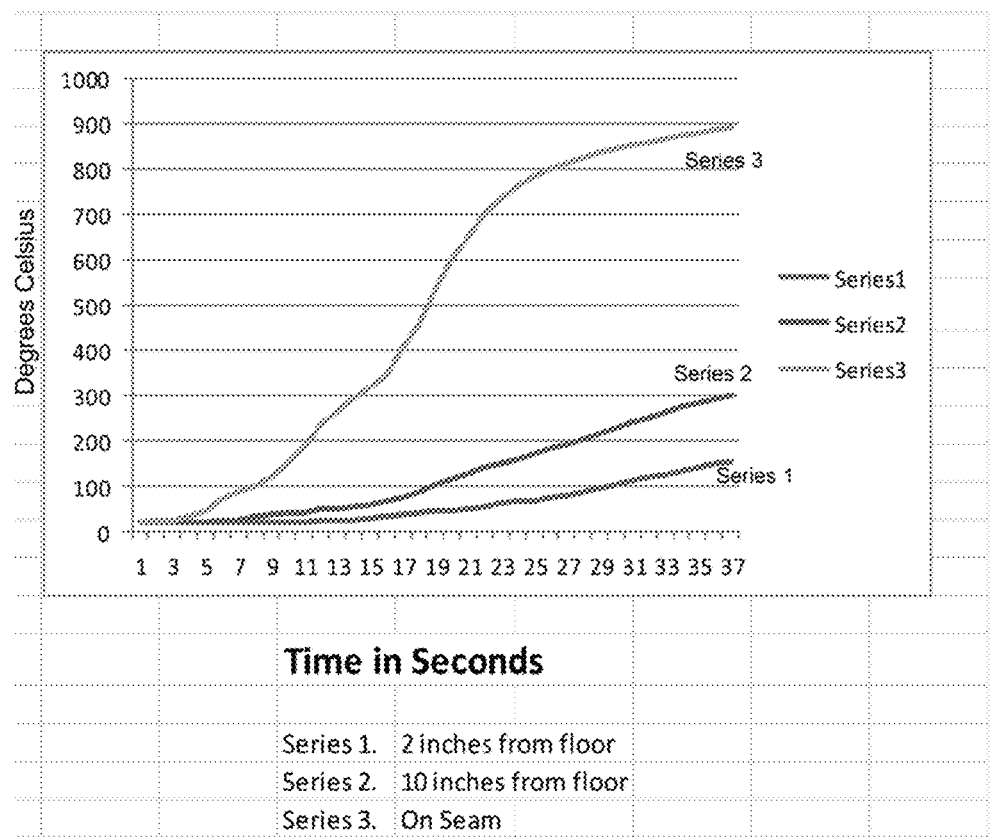
FIG. 25 shows a graph of temperature versus time in seconds for a commercially available specimen M2002, available from Weckworth Corporation or Anchor Industries.

FIG. 25 shows a graph of temperature versus time in seconds for a commercially available specimen M2002, available from Weckworth Corporation or Anchor Industries. The temperature of series 1 exceeded 150° C. in about 40 seconds.

Figure 26:
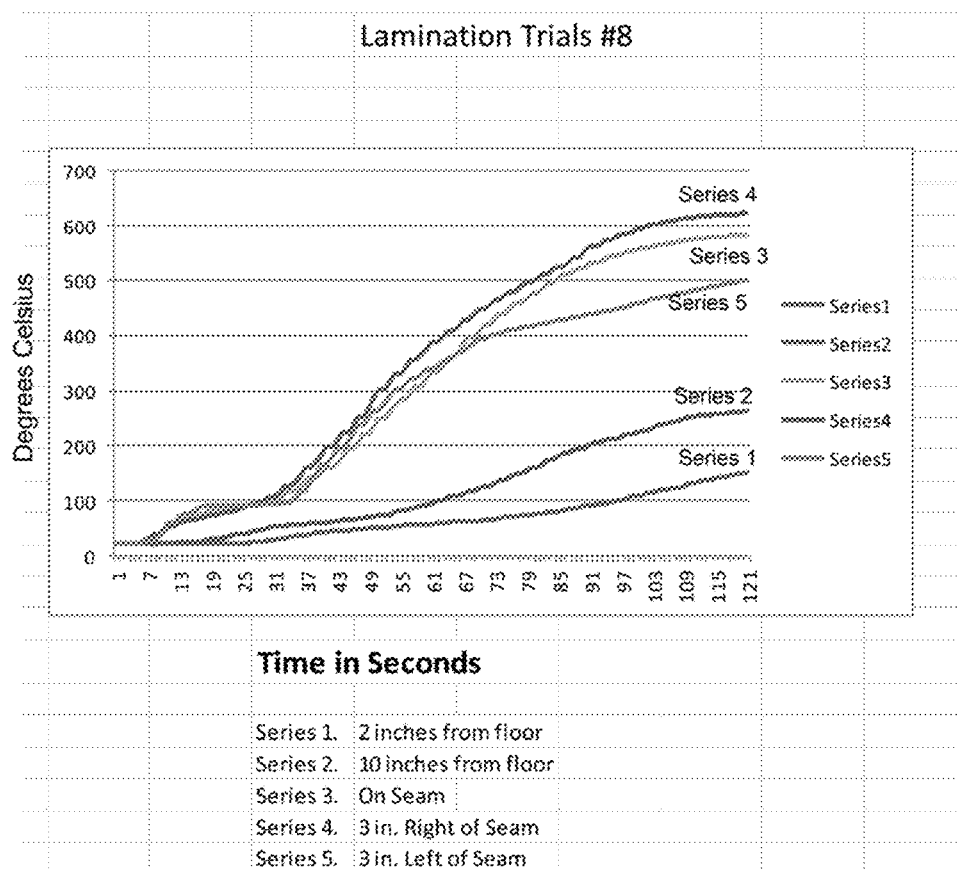
FIG. 26 shows a graph of temperature versus time in seconds for the test sample specimen as described in Example 4.

FIG. 26 shows a graph of temperature versus time in seconds for the test sample specimen as described in Example 4. The temperature of series 1 exceeded 150° C. in about 120 seconds, or about three times longer than the commercially available fire barrier specimen.

Figure 27:
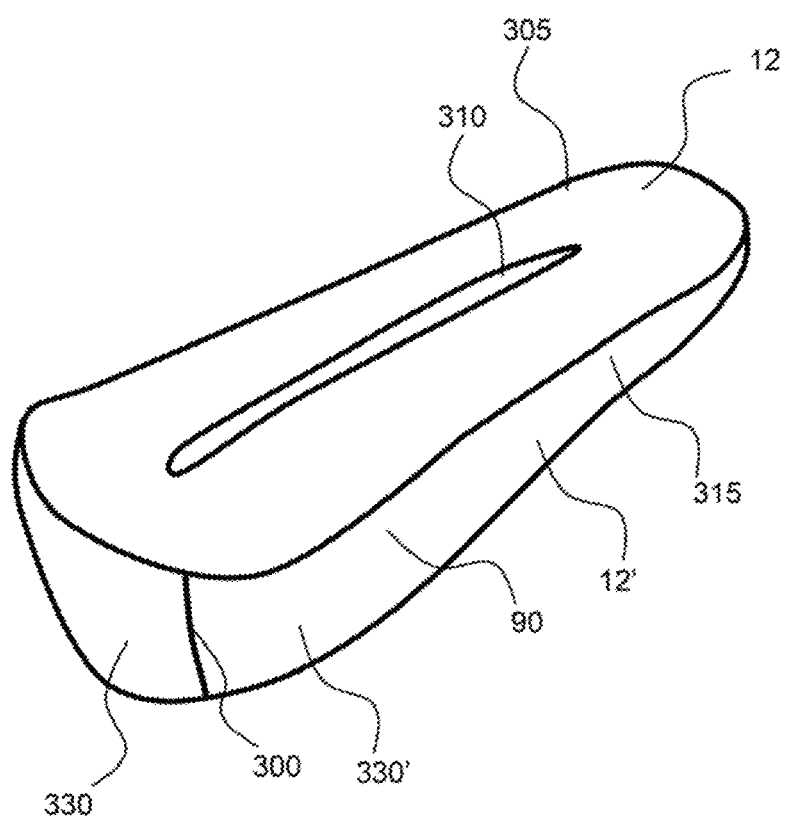
FIG. 27 shows a perspective bottom view of an exemplary fire shelter.

As shown in FIG. 27, an exemplary portable fire shelter 90 comprises a multilayer flame barrier 10 as described herein. A portable fire shelter, or the fabric thereof, may consist essentially of the lightweight multilayer flame barrier 10, as described herein. The floor portion 305 of the fire shelter comprises an opening 310 for entry into the fire shelter enclosure. A person may enter into the fire shelter and lay on the floor portion to seal the opening. The cover portion 315 of the fire shelter extends from the floor portion and is configured to cover a person in the event of a fire. The cover portion has a seam 300 that joins or attaches a first laminate panel 330 and a second laminate panel 330'. A seam cover, as described herein may be configured over the seam to provide additional protection from flame and heat. An exemplary portable fire shelter can be carried by a single person and weighs less than 10 lbs, and more preferably weights less than 8 lbs and even more preferably weights less than 5 lbs, not including a carrying case. An exemplary portable fire shelter may be folded or otherwise packed into a smaller case or pack and are often carried by fire fighters in the field. An exemplary portable fire shelter may weigh less than 4.5 lbs or 4 lbs and pack into a volume of about 600 cubic inches or less, 400 cubic inches or less. An exemplary portable fire shelter may comprise multilayer flame barrier materials that weigh less than about 40 oz/yd2, or more preferably less than about 30 oz/yd2 and even more preferably less than about 25 oz/yd2. This areal weight may include an outside layer and an inner multilayer flame barrier, as described herein.

Test Procedure: Thermal Protective Performance Testing—Convective Exposure Test

The document entitled, Screening Tests for Prototype Wildland Fire Shelters for External Inquiries, describes test procedures used in the testing of lightweight multilayer flame barrier materials and is incorporated herein by reference; a copy of document is provided with this filing.

The Convective Exposure Test applies to both woven and non-woven materials in the intended configuration of the shelter design. Specimens shall be 100 mm×100 mm (4 in.×4 in.). A minimum of five specimens shall be tested. Multilayer material systems, separable or not, shall be tested in the intended composite construction. All specimens to be tested shall be conditioned as specified in 1.2.

The test apparatus specified in ISO 9151:1995 Protective clothing against heat and flame—Determination of heat transmission on exposure to flame shall be used.

The calorimeter sensing surface should be smooth, clean, and painted with a quality high temperature flat black paint* of known absorptivity with a value of greater than 0.90. It may take two or three light coats to completely and evenly cover the surface. If the coating on the calorimeter is damaged due to cleaning of residues it should be cleaned and repainted prior to continued testing. *Krylon 1618 or Zynolyte Z635 have been found to be suitable.

Construction for the copper calorimeter shall be performed in accordance with ASTM F1939-08 Standard Test Method for Radiant Heat Resistance of Flame Resistant Clothing Materials with Continuous Heating, see 6.1.5 Sensor.

Procedure

Thermal protective performance testing shall be performed in accordance with ISO 9151:1995 Protective clothing against heat and flame—Determination of heat transmission on exposure to flame.

Specimens shall be mounted by placing the surface of the material to be used as the outside of the shelter face down on the mounting plate. The subsequent layers, if any, shall be placed in the order they would be used in the construction of the fire shelter material.

At the completion of each exposure, each specimen shall be examined for evidence of melting, shrinkage, or breaking open.

Report

The time to second degree burn shall be determined as the nearest 0.1 second at the point when the sensor response and the tissue tolerance curves cross. Performance shall be based on the time required to produce a second degree burn in human tissue as shown in Table 9. The individual test RPP rating of each specimen shall be reported. The average RPP rating shall be calculated and reported. If a RPP rating is greater than 60 then the RPP rating shall be reported as ">60". In calculating the average for the set of specimens a result of >60 shall be set as 60. If an individual result from any test set varies more than ±10% from the average result, the results from the test shall be discarded and another set of specimens shall be tested.

Computer Processing of the Data

The information provided in Table 1 shall be permitted to be used as the criteria of performance in the software of a computer program. In this case, the sensor shall be compared with the thermal response, second degree burn in human tissue, to determine the thermal end point. The product of the time to a second degree burn and the exposure heat flux shall be the TPP rating.

The TPP rating shall be calculated as the product of exposure heat flux and time to burn as follows:

$$TPP\ rating = F \times t$$

where:
F=exposure heat flux (cal/cm²-s)
t=time to burn (s).

TABLE 9

Human Tissue Tolerance to Second Degree Burn

| Exposure | Heat Flux | | Total Heat | | Calorimeter* Equivalent | | |
|---|---|---|---|---|---|---|---|
| | cal/cm²-s | kW/m² | cal/cm² | kJ/m² | T (° F.) | T (° C.) | mV |
| 1 | 1.2 | 50 | 1.20 | 50 | 16.0 | 8.9 | 0.46 |
| 2 | 0.73 | 31 | 1.46 | 61 | 19.5 | 10.8 | 0.57 |
| 3 | 0.55 | 23 | 1.65 | 69 | 22.0 | 12.2 | 0.63 |
| 4 | 0.45 | 19 | 1.80 | 75 | 24.0 | 13.3 | 0.69 |
| 5 | 0.38 | 16 | 1.90 | 80 | 25.3 | 14.1 | 0.72 |
| 6 | 0.34 | 14 | 2.04 | 85 | 27.2 | 15.1 | 0.78 |
| 7 | 0.30 | 13 | 2.10 | 88 | 28.0 | 15.5 | 0.80 |
| 8 | 0.274 | 11.5 | 2.19 | 92 | 29.2 | 16.2 | 0.83 |
| 9 | 0.252 | 10.6 | 2.17 | 95 | 30.2 | 16.8 | 0.86 |
| 10 | 0.233 | 9.8 | 2.33 | 98 | 31.1 | 17.6 | 0.89 |
| 11 | 0.219 | 9.2 | 2.41 | 101 | 32.1 | 17.8 | 0.92 |
| 12 | 0.205 | 8.6 | 2.46 | 103 | 32.8 | 18.2 | 0.94 |
| 13 | 0.194 | 8.1 | 2.52 | 106 | 33.6 | 18.7 | 0.97 |
| 14 | 0.184 | 7.7 | 2.58 | 108 | 34.3 | 19.1 | 0.99 |
| 15 | 0.177 | 7.4 | 2.66 | 111 | 35.4 | 19.7 | 1.02 |
| 16 | 0.168 | 7.0 | 2.69 | 113 | 35.8 | 19.8 | 1.03 |
| 17 | 0.160 | 6.7 | 2.72 | 114 | 36.3 | 20.2 | 1.04 |
| 18 | 0.154 | 6.4 | 2.77 | 116 | 37.0 | 20.6 | 1.06 |
| 19 | 0.148 | 6.2 | 2.81 | 118 | 37.5 | 20.8 | 1.08 |
| 20 | 0.143 | 6.0 | 2.86 | 120 | 38.1 | 21.2 | 1.10 |
| 25 | 0.122 | 5.1 | 3.05 | 128 | 40.7 | 22.6 | 1.17 |
| 30 | 0.107 | 4.5 | 3.21 | 134 | 42.8 | 23.8 | 1.23 |

Stoll, A. M., and M. A. Chianta, "Method and Rating System for Evaluation of Thermal Protection," Aerospace Medicine, Vol. 40, 1968, pp. 1232-1238.

*Iron-Constantan thermocouple

It will be apparent to those skilled in the art that various modifications, combinations and variations can be made in the present invention without departing from the spirit or scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A multilayer flame barrier comprising:
    a) an outside surface;
    b) an inside surface;
    c) a thickness;
    d) a barrier layer comprising:
        i) an insulation layer comprising a mica paper layer that is configured between an outer layer and an inner layer
    e) a first laminate panel comprising the multilayer flame barrier, and having a first edge, a first barrier surface and a first inside surface;
    f) a second laminate panel comprising the multilayer flame barrier, and having a second edge, a second barrier surface and a second inside surface;
    g) a seam that joins the first and second laminate panels comprising:
        ii) a seam tab;
            wherein the seam tab comprises the first and second laminate panels brought together with the inside surfaces proximal to each other and the first and second edges extending out from the barrier surfaces of the first and second laminate panels;
        iii) a multilayer laminate seam cover that extends over the seam tab from the first barrier surface to the second barrier surface to cover the first and second edge of the first and second laminate panels;
            wherein the multilayer laminate seam cover comprises:
                an intumescent layer configured on a barrier side of the seam;
                a seam insulation layer;
        iv) a foil layer adjacent the seam and the first and second barrier surfaces
    h) a seam stitch extending through the multilayer laminate seam cover and the seam tab.

2. The multilayer flame barrier of claim 1, wherein at least one of said outer layer or said inner layer is a fabric layer.

3. The multilayer flame barrier of claim 2, wherein the fabric layer is a fiberglass fabric.

4. The multilayer flame barrier of claim 1, wherein the outer layer is a metal foil.

5. The multilayer flame barrier of claim 1, further comprising a plurality of metal foil layers;
    wherein one of said plurality of metal foil layers is configured on said outside surface and
    wherein one of said plurality of metal foil layers is configured on said inside surface.

6. The multilayer flame barrier of claim 1, comprising a plurality of metal foil layers wherein the insulation layer is configured between a first metal foil layer and a second metal foil layer.

7. The multilayer flame barrier of claim 1, wherein the insulation layer comprises a plurality of fabric layers and wherein the mica paper is configured between a first fabric layer and a second fabric layer.

8. The multilayer flame barrier of claim 1, wherein the insulation layer comprises a first mica paper layer and a first fabric layer that are configured between a first metal foil layer on said outside surface, and a second metal foil layer.

9. The multilayer flame barrier of claim 1, wherein the insulation layer comprises an adhesive configured between and attaching mica paper layer to the outer layer and attaching the mica paper layer to the inner layer.

10. The multilayer flame barrier of claim 1, wherein the multilayer flame barrier is flexible and fold durable, wherein the multilayer flame barrier can be folded and subsequently unfolded without a substantial loss of flame barrier properties.

11. The multilayer flame barrier of claim 1, wherein the multilayer flame barrier is lightweight, having an aerial weight of no more than 30 oz/yd².

12. The multilayer flame barrier of claim 1, wherein the multilayer laminate seam cover comprises the multilayer flame barrier.

13. The lightweight multilayer flame barrier of claim 1, wherein the seam insulation layer comprises the multilayer flame barrier.

14. The lightweight multilayer flame barrier of claim 1, wherein the multilayer flame barrier of the seam insulation comprises at least one fabric layer attached to the mica paper layer.

15. A fire shelter comprising:
    a. a flexible enclosure made up of a plurality of laminate panels;
        wherein the flexible enclosure is fold durable;

b. a first laminate panel having a first edge, a first barrier surface and a first inside surface;
c. a second laminate panel having a second edge, a second barrier surface and a second inside surface;
wherein each of said first and second laminate panels comprise a multilayer flame barrier comprising:
  i. an outside surface;
  ii. an inside surface;
  iii. a thickness;
  iv. a barrier layer comprising:
    an insulation layer comprising a mice paper layer that is configured between an outer layer and an inner layer;
d. a seam that joins the first and second laminate panels comprising:
  i. a seam tab;
    wherein the seam tab comprises the first and second laminate panels brought together with the inside surfaces proximal to each other and the first and second edges extending out from the barrier surfaces of the first and second laminate panels;
  ii. a multilayer laminate seam cover that extends over the seam tab from the first barrier surface to the second barrier surface to cover the first and second edge of the first and second laminate panels; and
    wherein the multilayer laminate seam cover comprises:
      an intumescent layer configured on a barrier side of the seam;
      a seam insulation layer; and
      a foil layer adjacent the seam and the first and second barrier surfaces;
  iii. a seam stitch extending through the multilayer laminate seam cover and the seam tab.

16. The fire shelter of claim 15, wherein at least one of said outer layer or said inner layer is a fabric layer.

17. The fire shelter of claim 16, wherein the fabric layer is a fiberglass fabric.

18. The fire shelter of claim 15, wherein the outer layer is a metal foil.

19. The fire shelter of claim 15, further comprising a plurality of metal foil layers; wherein one of said plurality of metal foil layers is configured on said outside surface and wherein one of said plurality of metal foil layers is configured said inside surface.

20. The fire shelter of claim 15, wherein a first insulation layer configured between a first metal foil layer configured on said outside surface, and a second metal foil layer.

21. The fire shelter of claim 20, further comprising a second insulation layer configured between the second metal foil layer and a third metal foil layer.

22. The fire shelter of claim 21, wherein the first and second insulation layers comprise a fabric layer attached to the mica paper layer.

23. A fire shelter comprising:
a) a flexible enclosure made up of a plurality of laminate panels;
  wherein the flexible enclosure is fold durable;
b) a first laminate panel having a first edge, a first barrier surface and a first inside surface;
c) a second laminate Panel having a second edge, a second barrier surface and a second inside surface;
  wherein each of said first and second laminate panels comprise a multilayer flame barrier comprising:
    an outside surface;
    an inside surface;
    a thickness;
    a barrier layer comprising:
      an insulation layer comprising a mica paper layer that is configured between an outer layer and an inner layer;
d) a seam that loins the first and second laminate panels comprising:
  i) a seam tab;
    wherein the seam tab comprises the first and second laminate panels brought together with the inside surfaces proximal to each other and the first and second edges extending out from the barrier surfaces of the first and second laminate panels;
  ii) a multilayer laminate seam cover that extends over the seam tab from the first barrier surface to the second barrier surface to cover the first and second edge of the first and second laminate panels; and
  iii) a seam stitch extending through the multilayer laminate seam cover and A the seam tab;
e) a floor portion comprising:
  an intumescent layer configured on a barrier side of the floor;
  a seam insulation layer,
  a foil layer adjacent an inside of the enclosure.

24. The fire shelter of claim 15, wherein the insulation layer comprises an adhesive configured between and attaching the mica paper layer to the outer layer and attaching the mica paper layer to the inner layer.

25. The fire shelter of claim 24, wherein the adhesive comprises vermiculite.

26. The fire shelter of claim 15, wherein the multilayer flame barrier is flexible and fold durable, wherein the multilayer flame barrier can be folded into a package and subsequently unfolded without a substantial loss of flame barrier properties.

27. The fire shelter of claim 15, wherein the multilayer flame barrier is lightweight, having an aerial weight of no more than 30 oz/yd$^2$.

* * * * *